United States Patent
Donnelly et al.

(10) Patent No.: US 7,507,500 B2
(45) Date of Patent: Mar. 24, 2009

(54) DESIGN OF A LARGE BATTERY PACK FOR A HYBRID LOCOMOTIVE

(75) Inventors: Frank Wegner Donnelly, North Vancouver (CA); David Herman Swan, Halifax (CA); John David Watson, Evergreen, CO (US)

(73) Assignee: Railpower Technologies Corp., North Vancouver, BC (CA)

( * ) Notice: Subject to any disclaimer, the term of this patent is extended or adjusted under 35 U.S.C. 154(b) by 337 days.

(21) Appl. No.: 11/131,917

(22) Filed: May 17, 2005

(65) Prior Publication Data

US 2005/0269995 A1    Dec. 8, 2005

Related U.S. Application Data

(60) Provisional application No. 60/572,289, filed on May 17, 2004.

(51) Int. Cl.
*H01M 2/10*    (2006.01)
*H01M 10/50*    (2006.01)

(52) U.S. Cl. .......................... 429/99; 429/72; 429/120; 429/159

(58) Field of Classification Search .............. None
See application file for complete search history.

(56) References Cited

U.S. PATENT DOCUMENTS

| | | |
|---|---|---|
| 384,580 A | 6/1888 | Julien |
| 744,187 A | 11/1903 | Gibbs |
| 1,199,752 A | 10/1916 | Baker |
| 1,377,087 A | 5/1921 | Manns |
| 1,535,175 A | 4/1925 | Mancha |
| 2,403,933 A | 4/1946 | Lillquist |
| 2,472,924 A | 6/1949 | Schwendner |
| 2,510,753 A | 6/1950 | Multhaup |
| 2,704,813 A | 3/1955 | Stamm |
| 3,169,733 A | 2/1965 | Barrett, Jr. |
| 3,443,115 A | 5/1969 | Timmerman, Jr. |
| 3,569,810 A | 3/1971 | Thiele |
| 3,596,154 A | 7/1971 | Gurwicz et al. |
| 3,668,418 A | 6/1972 | Godard |
| 3,728,596 A | 4/1973 | Hermansson et al. |
| 3,737,745 A | 6/1973 | Chevaugeon et al. |
| 3,792,327 A | 2/1974 | Waldorf |
| 3,832,625 A | 8/1974 | Gyugyi |

(Continued)

FOREIGN PATENT DOCUMENTS

CA    1283472    4/1991

(Continued)

OTHER PUBLICATIONS

Supplemental Declaration of Frank Donnelly Under 37 CFR § 1.98; dated Jan. 25, 2007 for U.S. Appl. No. 11/070,848, 2 pages.

(Continued)

*Primary Examiner*—Jonathan Crepeau
(74) *Attorney, Agent, or Firm*—Merchant & Gould P.C.

(57) ABSTRACT

The present invention is directed to systems for prolonging battery life, such as maintaining battery cell temperatures in battery packs within specified limits, providing vibration and shock resistance, and/or electrically isolating groups of batteries from nearby conductive surfaces.

10 Claims, 20 Drawing Sheets

U.S. PATENT DOCUMENTS

| | | |
|---|---|---|
| 3,898,937 A | 8/1975 | Johnson |
| 3,919,948 A | 11/1975 | Kademann |
| 3,930,189 A | 12/1975 | Smith |
| 3,970,160 A | 7/1976 | Nowick |
| 3,982,164 A | 9/1976 | de Buhr |
| 3,997,822 A | 12/1976 | Logston et al. |
| 4,035,698 A | 7/1977 | Soderberg |
| 4,070,562 A | 1/1978 | Kuno et al. |
| 4,075,538 A | 2/1978 | Plunkett |
| 4,090,577 A | 5/1978 | Moore |
| 4,095,147 A | 6/1978 | Mountz |
| 4,096,423 A | 6/1978 | Bailey et al. |
| 4,107,402 A | 8/1978 | Dougherty et al. |
| 4,152,758 A | 5/1979 | Bailey et al. |
| 4,199,037 A | 4/1980 | White |
| 4,204,143 A | 5/1980 | Coleman |
| 4,217,527 A | 8/1980 | Bourke et al. |
| 4,284,936 A | 8/1981 | Bailey et al. |
| 4,309,645 A | 1/1982 | De Villeneuve |
| 4,344,139 A | 8/1982 | Miller et al. |
| 4,347,569 A | 8/1982 | Allen, Jr. et al. |
| 4,369,397 A | 1/1983 | Read |
| 4,417,194 A | 11/1983 | Curtiss et al. |
| 4,423,362 A | 12/1983 | Konrad et al. |
| 4,471,276 A | 9/1984 | Cudlitz |
| 4,471,421 A | 9/1984 | Brown et al. |
| 4,495,449 A | 1/1985 | Black et al. |
| 4,498,016 A | 2/1985 | Earleson et al. |
| 4,523,134 A | 6/1985 | Kinoshita et al. |
| 4,644,232 A | 2/1987 | Nojiri et al. |
| 4,700,283 A | 10/1987 | Tsutsui et al. |
| 4,701,682 A | 10/1987 | Hirotsu et al. |
| 4,719,861 A | 1/1988 | Savage et al. |
| 4,799,161 A | 1/1989 | Hirotsu et al. |
| 4,896,090 A | 1/1990 | Balch et al. |
| 4,900,944 A | 2/1990 | Donnelly |
| 4,936,610 A | 6/1990 | Kumar et al. |
| 4,941,099 A | 7/1990 | Wood et al. |
| 4,944,539 A | 7/1990 | Kumar et al. |
| 4,950,964 A | 8/1990 | Evans |
| 4,961,151 A | 10/1990 | Early et al. |
| 5,129,328 A | 7/1992 | Donnelly |
| 5,212,431 A | 5/1993 | Origuchi et al. |
| 5,264,764 A | 11/1993 | Kuang |
| 5,281,900 A | 1/1994 | Park |
| 5,289,093 A | 2/1994 | Jobard |
| 5,306,972 A | 4/1994 | Hokanson et al. |
| 5,317,669 A | 5/1994 | Anderson et al. |
| 5,331,261 A | 7/1994 | Brown et al. |
| 5,332,630 A | 7/1994 | Hsu |
| 5,343,970 A | 9/1994 | Severinsky |
| 5,359,228 A | 10/1994 | Yoshida |
| 5,376,868 A | 12/1994 | Toyoda et al. |
| 5,392,716 A | 2/1995 | Orschek et al. |
| 5,424,948 A | 6/1995 | Jordan, Jr. |
| 5,428,538 A | 6/1995 | Ferri |
| 5,436,538 A | 7/1995 | Garvey et al. |
| 5,436,540 A | 7/1995 | Kumar |
| 5,436,548 A | 7/1995 | Thomas |
| 5,453,672 A | 9/1995 | Avitan |
| 5,480,220 A | 1/1996 | Kumar |
| 5,508,924 A | 4/1996 | Yamashita |
| 5,510,203 A | 4/1996 | Hamada et al. |
| 5,510,693 A | 4/1996 | Theobald |
| 5,511,749 A | 4/1996 | Horst et al. |
| 5,528,148 A | 6/1996 | Rogers |
| 5,564,795 A | 10/1996 | Engle |
| 5,568,023 A | 10/1996 | Grayer et al. |
| 5,580,677 A | 12/1996 | Morishita et al. |
| 5,580,685 A | 12/1996 | Schenk |
| 5,585,706 A | 12/1996 | Avitan |
| 5,589,743 A | 12/1996 | King |
| 5,610,499 A | 3/1997 | Rogers |
| 5,610,819 A | 3/1997 | Mann et al. |
| 5,629,567 A | 5/1997 | Kumar |
| 5,629,596 A | 5/1997 | Iijima et al. |
| 5,629,601 A | 5/1997 | Feldstein |
| 5,631,532 A | 5/1997 | Azuma et al. |
| 5,646,510 A | 7/1997 | Kumar |
| 5,659,240 A | 8/1997 | King |
| 5,661,378 A | 8/1997 | Hapeman |
| 5,677,610 A | 10/1997 | Tanamachi et al. |
| 5,685,507 A | 11/1997 | Horst et al. |
| 5,696,438 A | 12/1997 | Hamilton |
| 5,698,955 A | 12/1997 | Nii |
| 5,710,699 A | 1/1998 | King et al. |
| 5,735,215 A | 4/1998 | Tegeler |
| 5,751,137 A | 5/1998 | Kiuchi et al. |
| 5,765,656 A | 6/1998 | Weaver |
| 5,817,435 A * | 10/1998 | Shimakawa et al. ......... 429/176 |
| 5,820,172 A | 10/1998 | Brigham et al. |
| 5,856,037 A | 1/1999 | Casale et al. |
| 5,898,281 A | 4/1999 | Bossoney et al. |
| 5,898,282 A | 4/1999 | Drozdz et al. |
| 5,939,861 A | 8/1999 | Joko et al. |
| 5,964,309 A | 10/1999 | Kimura et al. |
| 5,992,950 A | 11/1999 | Kumar et al. |
| 5,998,880 A | 12/1999 | Kumar |
| 6,012,011 A | 1/2000 | Johnson |
| 6,021,251 A | 2/2000 | Hammer et al. |
| 6,023,137 A | 2/2000 | Kumar et al. |
| 6,025,086 A | 2/2000 | Ching |
| 6,027,181 A | 2/2000 | Lewis et al. |
| 6,082,834 A | 7/2000 | Kolbe et al. |
| 6,104,148 A | 8/2000 | Kumar et al. |
| 6,175,272 B1 | 1/2001 | Takita |
| 6,208,097 B1 | 3/2001 | Reddy et al. |
| 6,211,646 B1 | 4/2001 | Kouzu et al. |
| 6,218,807 B1 | 4/2001 | Sakaue et al. |
| 6,274,998 B1 | 8/2001 | Kaneko et al. |
| 6,308,639 B1 | 10/2001 | Donnelly et al. |
| 6,331,365 B1 | 12/2001 | King |
| 6,359,346 B1 | 3/2002 | Kumar |
| 6,367,891 B1 | 4/2002 | Smith et al. |
| 6,371,573 B1 | 4/2002 | Goebels et al. |
| 6,384,489 B1 | 5/2002 | Bluemel et al. |
| 6,405,705 B1 | 6/2002 | Dunsworth et al. |
| 6,408,766 B1 | 6/2002 | McLaughlin et al. |
| 6,417,646 B1 | 7/2002 | Huykman et al. |
| 6,421,618 B1 | 7/2002 | Kliman et al. |
| 6,441,581 B1 | 8/2002 | King et al. |
| 6,449,536 B1 | 9/2002 | Brousseau et al. |
| 6,456,674 B1 | 9/2002 | Horst et al. |
| 6,456,908 B1 | 9/2002 | Kumar |
| D464,622 S | 10/2002 | Donnelly |
| 6,470,245 B1 | 10/2002 | Proulx |
| 6,486,568 B1 | 11/2002 | King et al. |
| 6,497,182 B2 | 12/2002 | Melpolder et al. |
| 6,507,506 B1 | 1/2003 | Pinas et al. |
| 6,532,405 B1 | 3/2003 | Kumar et al. |
| 6,537,694 B1 | 3/2003 | Sagiura et al. |
| 6,564,172 B1 | 5/2003 | Till |
| 6,581,464 B1 | 6/2003 | Anderson et al. |
| 6,591,758 B2 | 7/2003 | Kumar |
| 6,608,396 B2 | 8/2003 | Downer et al. |
| 6,611,116 B2 | 8/2003 | Bachman et al. |
| 6,612,245 B2 | 9/2003 | Kumar et al. |
| 6,612,246 B2 | 9/2003 | Kumar |
| 6,615,118 B2 | 9/2003 | Kumar |
| 6,618,662 B2 | 9/2003 | Schmitt et al. |
| 6,627,345 B1 | 9/2003 | Zemlok et al. |
| 6,634,303 B1 | 10/2003 | Madsen et al. |
| 6,653,002 B1 | 11/2003 | Parise |
| 6,658,331 B2 | 12/2003 | Horst et al. |

| | | | |
|---|---|---|---|
| 6,678,972 B2 | 1/2004 | Naruse et al. | |
| 6,688,481 B1 | 2/2004 | Adner et al. | |
| 6,691,005 B2 | 2/2004 | Proulx | |
| 6,697,716 B2 | 2/2004 | Horst | |
| 6,725,134 B2 | 4/2004 | Dillen et al. | |
| 6,728,606 B2 | 4/2004 | Kumar | |
| 6,737,822 B2 | 5/2004 | King | |
| 6,765,315 B2 | 7/2004 | Hammerstrom et al. | |
| 6,812,656 B2 | 11/2004 | Donnelly et al. | |
| 6,823,835 B2 | 11/2004 | Dunsworth et al. | |
| 6,829,529 B2 | 12/2004 | Trefzer et al. | |
| 6,829,556 B2 | 12/2004 | Kumar | |
| 6,879,054 B2 | 4/2005 | Gosselin | |
| 6,885,920 B2 | 4/2005 | Yakes et al. | |
| 6,909,200 B2 | 6/2005 | Bouchon | |
| 6,909,201 B2 | 6/2005 | Murty et al. | |
| 6,909,959 B2 | 6/2005 | Hallowell | |
| 6,941,218 B2 | 9/2005 | Wolf et al. | |
| 6,973,880 B2 | 12/2005 | Kumar | |
| 7,102,313 B2 | 9/2006 | Kadota et al. | |
| 2002/0034685 A1* | 3/2002 | Sato et al. | 429/176 |
| 2002/0179552 A1* | 12/2002 | Marraffa | 211/49.1 |
| 2002/0190525 A1 | 12/2002 | Worden et al. | |
| 2003/0150352 A1 | 8/2003 | Kumar | |
| 2003/0151387 A1 | 8/2003 | Kumar | |
| 2003/0233959 A1 | 12/2003 | Kumar | |
| 2004/0133315 A1 | 7/2004 | Kumar et al. | |
| 2005/0024001 A1 | 2/2005 | Donnelly et al. | |
| 2005/0045058 A1 | 3/2005 | Donnelly et al. | |
| 2005/0189886 A1 | 9/2005 | Donnelly | |
| 2005/0189887 A1 | 9/2005 | Donnelly et al. | |
| 2005/0206230 A1 | 9/2005 | Donnelly | |
| 2005/0206331 A1 | 9/2005 | Donnelly | |
| 2005/0251299 A1 | 11/2005 | Donnelly | |
| 2005/0264245 A1 | 12/2005 | Donnelly | |
| 2005/0279243 A1 | 12/2005 | Bendig et al. | |
| 2006/0001399 A1 | 1/2006 | Salasoo et al. | |
| 2006/0266256 A1 | 11/2006 | Maler | |

FOREIGN PATENT DOCUMENTS

| | | |
|---|---|---|
| CA | 2411132 | 5/2004 |
| EP | 0 348 938 | 1/1990 |
| GB | 873167 | 3/1960 |
| GB | 1129709 | 11/1966 |
| GB | 1 312 699 | 10/1970 |
| GB | 2 005 205 A | 9/1977 |
| WO | WO 03/072388 | 9/2003 |
| WO | WO 2004/042890 | 5/2004 |
| WO | WO 2005/030550 | 4/2005 |
| WO | WO 2005/079504 | 9/2005 |
| WO | WO 2005/084335 | 9/2005 |
| WO | WO 2005/086910 | 9/2005 |
| WO | WO 2005/097573 | 10/2005 |

OTHER PUBLICATIONS

International Preliminary Report on Patentability dated Nov. 30, 2006 for PCT Application No. PCT/US05/17393, 3 pages.

"The Car and Locomotive Encyclopedia" by Kalmbach Publishing Company, 1980, 3 pages.

"Motor Control Electronics Handbook" edited by Richard Valentine, McGraw Hill 1998, ISBN 0-07-066810-8, 1998, 31 pages.

"Progress in Overcoming the Failure Modes Peculiar to VRLA Batteries", A. Cooper, P.T. Moseley, Journal of Power Sources 113 (2003) 200-208.

"Research Results from the Advanced Lead-Acid Battery Consortium Point the Way to Longer Life and Higher Specific Energy for Lead/Acid Electric-vehicle Batteries", P.T. Moseley, Journal of Power Sources 73 (1998) 122-126.

"Improving the Valve-Regulated Lead Acid Battery", P.T. Moseley, Journal of Power Sources 88 (2000) 71-77.

"Keeping Up the Pressure-Strategies to Maintain Plate-Group Pressure and Extend the Cycle Life of VRLA Batteries", M.J. Weighall, Journal of Power Sources 95 (2001) 209-217.

"VRLA Traction", First International Symposium on the Use of VRLA Batteries in Traction Application, Honolulu, Jun. 2005.

International Search Report dated Nov. 2, 2005 for PCT Application No. 05/17393, 3 pages.

International Written Opinion dated Nov. 2, 2005 for PCT Application No. 05/17393, 6 pages.

Thompson, "Electric Transportation," International Textbook Co., Scranton, Pa; (1st Ed., 1940), pp. 254-262.

Perreault, David J. et al, "A New Design For Automotive Alternators", 2000 International Congress on Transportation Electronics. (Convergence 2000), pp. 583-594, Oct. 2000, SAE paper 2000-01-C084.

Railway Age, "Switchers, the Gen-Set generation", Simmons-Boardman Publishing Corporation, vol. 207 No. 3, copyright 2006, 1 page.

Mercer, "Innovative Use of Horsepower—Hybrid Bus Powered by Gas Turbine," *Diesel Progress* (Dec. 1997), pp. 56-57.

Mendler, "The Technological Opportunities of Hybrid Electric Vehicles," Society of Automotive Engineers, Inc. (1996), pp. 1-16.

Berg, "Concept Truck Addresses Future Clean Air Demands With Hybrid Turbine-Electric Powertrain," Diesel Progress Engine & Drives, pp. 54-56, Feb. 1996.

Nene, "Advanced Propulsion Systems for Urban Rail Vehicles: Chapter 2: DC Drives with a Chopper Controller," Prentice-Hall, Inc. (1985), pp. 18-45.

Kostic et al., "An Analytic Solution of the Choppers Ripple Currents," Proceedings of the 1993 IEEE/ASME Joint Railroad Conference, Apr. 1993, pp. 103-107.

Hassan Moghbelli et al., "Chopper Design for NICTD Locomotives," Proceedings of the 1993 IEEE/ASME Joint Railroad Conference, Apr. 1993, pp. 67-75.

C.E. Band et al., "Development of and Operational Experience with a High Powered D.C. Chopper for 1500 Volt D.C. Railway Equipment," Institution of Electrical Engineers Conference Publication 53 on Power Thyristors and Their Applications, Part 1 (May 1969), 1-page.

M.J. Hapeman et al., "Diesel Electric Locomotive Propulsion Systems—A Look into the Future," IEEE Technical Papers Presented at the 1985 Joint ASME/IEEE Railroad Conference, New York City, NY, Apr. 16-18, 1985, pp. 108-115.

Joseph Szymborski et al., "Examination of VRLA Battery Cells Sampled from the Metlakatla Battery Energy Storage System", The Sixteenth Annual Battery Conference on Applications and Advances, 2001, pp. 131-138.

"Locomotive Energy Storage System," Advanced Railway Technology, Inc. (Dec. 1985), 22 pages.

Declaration of Frank Donnelly Under 37 CFR § 1.98, 5 pages, dated Apr. 4, 2004 for U.S. Appl. No. 10/650,011.

Declaration of Ronald Bailey under 37 CFR § 1.98 dated Dec. 3, 2004 for U.S. Appl. No. 10/650,011, 3 pages.

"Lead-Acid Battery State of Charge vs. Voltage", Richard Perez, Home Power #36, Aug./Sep. 1993, 5 pages.

"Thermal Evaluation of the Honda Insight Battery Pack" M.D. Zolot et al. National Renewable Energy Laboratory, Presented at the 36th Intersociety Energy Conversion Engineering Conference, Savannah Georgia, Jul. 29 to Aug. 2 2001, 9 pages.

"Development of a New Battery System for Hybrid Vehicle", Tomokazu Yamauchi et al, Toyota, presented at the EVS 17 in Montreal, Oct. 2000, 7 pages.

"Supercapacitive Energy Storage for Diesel-Electric Locomotives", Destraz, Barrade and Rufer, Swiss Federal Institute of Technology, paper presented at SPEEDAM 2004, Jun. 16, Capri, Italy, 6 pages.

Press Release: "French Railway Company Voies Ferees Legeres et Industielles (VFLI) Puts Its Trust in Deutch Engines", Jun. 2003, 2 pages.

"LNG as a Fuel for Railroads: Assessment of Technology Status and Economics", Pera and Moyer, Acurex Corporation, 1993, Gas Research Institute contract No. 5091-292-2153, 122 pages.

"Comparative Economic Assessment of a Natural Gas Fueled Locomotive with On-Board CNG Storage to Diesel and LNG Variants", Donnelly et al, IEEE/ASME Joint Railroad Conference, Baltimore, Apr. 1995, 30 pages.

"Linear/Switchmode Voltage Regulator Handbook" Motorola, Inc. 1982, 3 pages.

"The Control of Switched Reluctance Drives and their Use for Flywheel Energy Storage", Brabandere et al., 5 pages, IEEE Young researchers symposium in electrical power engineering—Distributed generation (CD Rom), Leuven, Belgium, Feb. 7-8, 2002.

"Performance and Control of the Switched Reluctance Motor", Dahdah et al, 4 pages, paper presented at Australasian Universities Power Engineering Conference, Sep. 26-29, 1999.

Design of Switched Reluctance Motors and Development of a Universal Controller for Switched Reluctance and Permanent Magnet Brushless DC Motors, Phd Dissertation, Virginia Polytechnic Institute and State University, Prahveen Vijayraghavan, Blacksburg, VA, Nov. 2001, 215 pages.

"Li-Ion Battery-Powered Buck-Boost Regulator Minimizes Portable Product Size", Chen, IIC-China/ESC-China Conference Proceedings, 2002, 5 pages.

* cited by examiner

DESIGN OF A LARGE BATTERY PACK FOR A HYBRID LOCOMOTIVE

CROSS REFERENCE TO RELATED APPLICATION

The present application claims the benefits, under 35 U.S.C. §119(e), of U.S. Provisional Application Ser. No. 60/572,289, filed May 17, 2004, of the same title to Donnelly, et al., which is incorporated herein by this reference.

FIELD

The present invention relates generally to the design of a large battery pack suitable for a hybrid locomotive and specifically to a battery pack using forced convection cooling.

BACKGROUND

The use of energy storage batteries in combination with a generator is known for automobiles, buses and other road and highway vehicles. Electric batteries have been used to store electric power to drive electric locomotives as, for example, disclosed by Manns in U.S. Pat. No. 1,377,087 which is incorporated herein by reference. Donnelly has disclosed the use of a battery-dominant hybrid locomotive which has a ratio of energy storage capacity to charging power in the range of 4 to 40 hours in U.S. Pat. No. 6,308,639 which is also incorporated herein by reference.

One of the principal objectives of hybrid locomotive design is to operate the locomotive in such a way as to maximize the lifetime of its energy storage unit. This is because the cost structure of an energy storage unit such as for example a battery pack or capacitor bank is primarily one of capital cost and secondarily of operating costs. It is known, for example, that operating a lead-acid battery pack in a preferred state-of-charge ("SOC") range or with a preferred charging algorithm or with both tends to extend serviceable lifetime of cells in cyclical service towards that of float service.

Large energy storage battery systems are known, for example, from diesel submarines. In this application, a pack of large storage batteries are used to provide power principally when the submarine is operating underwater. These submarine battery packs are designed to provide high energy storage capacity for extended underwater operations during which the battery pack cannot be recharged. Battery pack cost and lifetime are generally not major concerns.

In the late 1990s, a large stationary battery system was installed at the island village of Metlakatla, Ak. The 1.4 MW-hr, 756 volt battery system was designed to stabilize the island's power grid providing instantaneous power into the grid when demand was high and absorbing excess power from the grid to allow its hydroelectric generating units to operate under steady-state conditions. Because the battery pack is required to randomly accept power as well as to deliver power on demand to the utility grid, it is continuously operated at between 70 and 90% state-of-charge. Equalization charges are conducted during maintenance periods scheduled only twice each year.

It has long been thought that to achieve optimum life and performance from a lead-acid battery, it is necessary to float the battery under rigid voltage conditions to overcome self-discharge reactions while minimizing overcharge and corrosion of the cell's positive grid. This has resulted in batteries being used primarily in a standby mode. As used in a hybrid locomotive or as a power grid storage and control system, the battery is rapidly and continuously cycled between discharge and charge over a preferred range of total charge.

It has been possible to assess aging and performance capabilities over time in this controlled cycling type of service by detailed monitoring. Data has been generated to demonstrate the long-term viability of cells in this type of use, performing functions such as load leveling, peak shaving and power quality enhancement. Detailed examination of the cells plates and separators have shown little wear indicating that controlled operation such as described above can result in battery lifetimes that can approach design lifetimes associated with float service.

However, there remains a need for a more comprehensive procedure suitable for designing large battery pack assemblies with long lifetimes for hybrid locomotives that satisfies a number of diverse requirements for locomotive performance, maintenance, safety and cost-effective operation.

A principal design objective for many applications is maximum energy storage capacity. When this objective is achieved, the power output of the battery pack is usually more than sufficient. In many applications, a principal design objective is low capital and operating cost. This usually means a lead-acid battery with some compromise in power or capacity. In applications such as hybrid locomotives used as yard or road switcher locomotives or commuter locomotives, maximum power out is a principal design objective. A further principal design objective is battery pack lifetime since this directly relates to the unit cost of power supplied indirectly through a battery system.

The design objectives of a large battery pack for a hybrid locomotive has a unique set of problems to achieve its principal design goals of high storage capacity, high power on demand, cyclical operation, long lifetime and a cost effective design for a large battery pack. These objectives must be met on a locomotive platform subject to shock and vibration as well as extreme changes in ambient temperature conditions. There therefore remains a need for a battery design for a hybrid locomotive that is capable of operation requiring a combination of high storage capacity, high power capability for rapid acceleration, long battery pack lifetime, and a low cost capital and replacement cost structure under diverse locomotive operating environments. These and other objectives are met by the design approach described in the present invention.

SUMMARY

These and other needs are addressed by the various embodiments and configurations of the present invention. The present invention is directed generally to a method for design and operation of an energy storage battery pack for a large hybrid vehicle such as a hybrid locomotive, maritime vessel, hybrid bus, hybrid subway or hybrid light rail vehicle. The method disclosed herein may also be applied to an energy storage unit comprised of energy storage capacitors.

In a preferred embodiment of the present invention, a battery pack is designed to maintain cells within a specified temperature difference of all other battery cells by removing thermal energy generated within individual cells by forced convective cooling means applied to selected outside surfaces of the cells. The temperature operating range for a large hybrid locomotive battery pack is typically between minus 40° C. and plus 45° C. The temperature differential between any individual cells is preferably less than about 5° C. and more preferably less than about 3° C. The temperature of individual battery cells is maintained by placing one to several battery cells inside an isolation container and forcing a moderate flow of air along the sides of the batteries, preferably the sides of the cells perpendicular to the orientation of the internal plate pairs. This practice extends the useful lifetime of the battery pack as a whole.

In this embodiment, isolation containers are arranged to form a module or battery pack in such a way as to substantially maximize the cooling efficiency while maintaining the ability to compactly stack isolation containers and/or battery modules and maintain low resistance in the main current connections. Cooler air is circulated from the bottom of the battery pack, around the battery pack modules, and to the top of the battery pack so as to more evenly distribute the temperature of the air that is then forced through individual isolation containers.

Warm air is expelled from the battery pack compartment to the outside, and cooler air is inputted to the battery pack compartment when the outside air temperature is less than that of the air in the battery pack compartment on hot days. On very cold days, it is desirable to restrict the flow of warm air from the battery pack compartment to the outside and intake cooler air to the battery pack compartment only as necessary so as to maintain the temperature of battery pack compartment air as low as possible within a predetermined operating temperature range.

The above three air control procedures are designed to maintain individual battery cells at close to the same temperature while also controlling the overall operating temperature range of the battery pack in relation to extreme ambient temperature.

In another aspect of this embodiment, the use of isolation containers is integrated with a means to isolate cells from mechanical shock and vibration, such as is commonly experienced in rail systems. This control of mechanical environment also acts to extend the lifetime of the battery cells and the battery pack as a whole.

In another aspect of this embodiment, the use of isolation containers also results in a system where a fire or meltdown of individual battery cells can be readily controlled with minimal or no effect on the rest of battery pack.

In another aspect of this embodiment, the use of isolation containers also results in a system where battery cells can be readily inspected, serviced and/or replaced no matter where in the battery pack they are located.

In another aspect of this embodiment, the use of iso lation containers can be configured to provide electrical isolation of individual battery cells from each other so as to avoid the possibilities for inadvertently shorting out battery cells. This design feature is important in a battery pack where the cells are commonly connected electrically in series so there can be a large voltage drop across the battery pack. This feature also acts to extend the lifetime of the battery cells, and the battery pack as a whole, by minimizing or eliminating inadvertent short circuits.

In a second embodiment, a combination of procedures is disclosed for maximizing the ampere-hour lifetime of a battery pack. First, individual battery cells are maintained within a specified temperature differential as described above. Second, the temperature level of all the cells is maintained within a second predetermined range by controlling the inflow and outflow of air to the battery pack compartment in response to ambient temperature conditions. Third, the shock and vibration environment of individual battery cells are controlled within predetermined maximum values. Fourth, the battery pack is operated such that its state of charge ("SOC") is preferably between 20% to 95% and more preferably between 50% and 95%. This practice reduces the tendency of the condition of individual battery cells to diverge, thereby requiring fewer equalization charges which can reduce overall battery pack lifetime. Fifth, the battery pack is operated to avoid deep discharging the battery cells for example below 20% SOC so as not to cause unnecessary level of stress on the cell plates which tends to reduce battery lifetime. Sixth, when it is necessary to overcharge the battery pack (perform an equalization charge), a current interrupt charging algorithm is used. This is known to significantly extend battery cell lifetime because it allows the cells to cool down during charging and avoid the oxygen recombination cycle which leads to early failure of the negative plate by oxidation of the sulfuric acid to sulfate. Seventh, it is also preferable to perform equalization charges at a high rate of current so as to more evenly pass current through the plates, a practice which is also known to extend cell lifetime.

When all of the above procedures are followed at least for most of the operational lifetime of the battery pack, the lifetime of the battery pack can be extended as measured by the equivalent full discharge cycles calculated for the battery pack. This extension in lifetime then directly reduces the cost to store energy in the battery pack since the capital cost of the battery pack is typically 90% or more of the total cost (capital plus operating) of the battery pack.

In a third embodiment, air ducts are molded into the battery cases in such a way that two or more battery cells may be nested so that the ducts are aligned. A forced air convective cooling system can then be used to flow air through these ducts to cool the battery cells. Another objective is to fabricate the battery cases of this embodiment with a material that absorbs shock and vibration.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

The following definitions are used herein:

A "battery cell" is an individual sealed or vented unit comprised of one or more internal plate assemblies, each plate assembly comprised of a negative plate, a separator material and a positive plate. The battery cell may have one or more external negative and positive terminals.

A "plate pair" is the basic unit of a cell and is comprised of a negative plate, a separator material and a positive plate. When the separator is impregnated with an appropriate electrolyte, a voltage typical of the particular battery chemistry is developed between the positive and negative plates. In a lead-acid battery, this voltage is typically about 2.13 volts at full charge.

A "battery rack" is a mechanical structure in which battery cells are mounted.

A "battery module" is a collection of cells mounted in a battery rack frame assembly of convenient size.

A "battery pack" is an assembly of many individual battery cells connected electrically. The assembly may be comprised of subassemblies or modules comprised of individual battery cells. The battery pack usually, but not always, has one overall positive and negative terminals for charging and discharging the cells in the pack.

"Float service" as applied to a battery means operating the battery under rigid voltage conditions to overcome self-discharge reactions while minimizing overcharge and corrosion of the cell's positive grid.

"At least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

Figure 1:
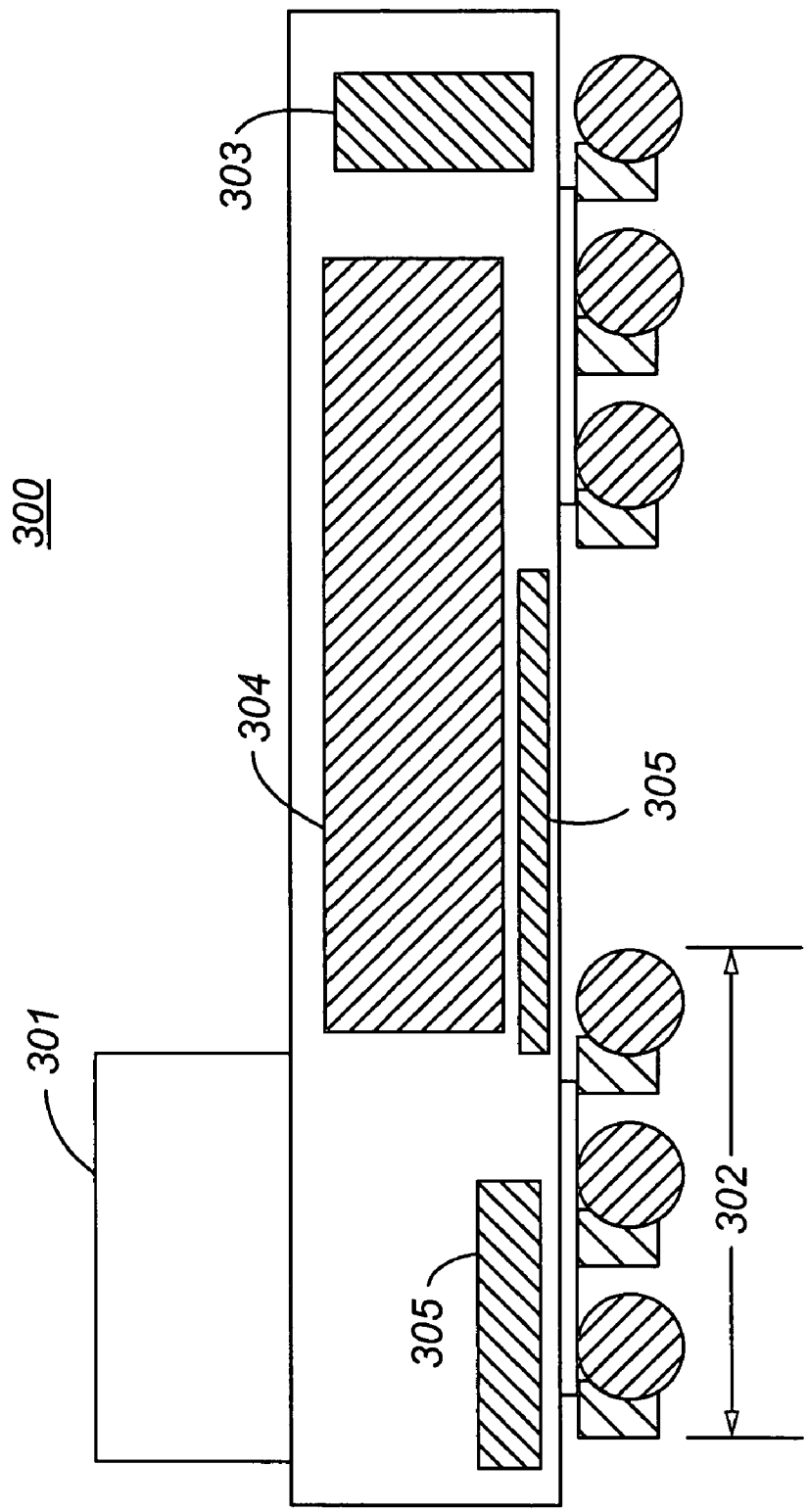
FIG. 1 is a schematic side view of a prior art assembly of a battery pack, generator and ballast installed on a locomotive frame.

The energy storage capacity of a battery cell can be characterized by its ampere-hour rating. The lifetime of the battery cell can also be characterized by a number of ampere-hours throughput of expected service. For example, a lead-acid battery cell may have a capacity rating of 1,500 ampere-hours and a lifetime estimated at 1.5 million ampere-hours total throughput. The ratio of expected lifetime to storage capacity is therefore equivalent to the number of cycles of full discharges that the battery cell can deliver over its lifetime. In the example above, this would be 1,000 full discharge cycles. This does not necessarily mean the battery cell can actually be fully discharged 1,000 times but it is a means to characterize the lifetime of the battery cell under the operating conditions recommended to achieve its specified lifetime. This method of estimating lifetime for a battery is appropriate to batteries that are continually discharged and recharged (cycled) during service, where the discharging and recharging may be held within a predetermined range that need not include full discharging and recharging. This can be contrasted to float service where the battery is operated under rigid voltage conditions which usually results in a lifetime measured in years of operation rather than in equivalent full discharge cycles.

An objective of hybrid locomotive design is to operate the locomotive in such a way as to maximize the lifetime of its energy storage unit. This is because the cost structure of an energy storage unit such as for example a battery pack or capacitor bank is primarily one of capital cost and secondarily of operating costs. It is known, for example, that operating a lead-acid battery pack generally within a predetermined range of state-of-charge ("SOC") range (for example from about 50% to about 95%) as well as applying known charging algorithms and procedures, applying, tends to extend serviceable lifetime towards that of float service.

In addition to operating the battery pack as described above, it is important to maintain all individual battery cells under nearly identical conditions, such as operating temperature for example, so that individual cells can age at approximately the same rate by minimizing the number of equalization charges that are required. When individual battery cells are exposed to substantially different environments, they may diverge in performance because of, for example, different reaction rates on the plates as a result of differing operating temperatures. The corrosion rates observed on battery plates are known to be temperature dependent so maintaining individual battery cells in a battery pack at approximately the same temperature reduces the uneven buildup of corrosion on the battery cell plates thereby extending the useful lifetime of the battery pack as a whole. From time to time, these diverging cells can be brought back into rough balance by applying one or more equalization charges. A large number of equalization charges is known to reduce the lifetime of all the battery cells. This has always been a problem in large battery packs since the battery cells in the interior of the battery pack are much more thermally insulated than cells on the outside of the battery pack and therefore tend to operate at a higher temperature than cells on the outside of the battery pack. The present invention overcomes this thermal variation amongst individual cells. When coupled with the practice of operating the battery pack in a predetermined SOC range, the operating lifetime of the battery pack can be extended further.

In order to be cost-effective for application to rail and other transportation hybrid systems, an energy storage unit must be:

packaged to conform to vehicle load and weight distribution requirements readily serviceable, especially for replacement of individual energy storage components capable of its desired energy storage capacity and power output performance able to withstand mechanical loads especially vibration and shock able to conform to various safety regulations especially with respect to overheating of battery cells that can lead to meltdown and/or fire able to operate in extreme ambient environments without serious effect on equipment lifetime.

resistant to electrical ground faults by improved electrical isolation

The following is a description of a hybrid locomotive battery pack design that utilizes a forced air convection system to provide cooling for battery cells by employing isolation containers. The use of isolation containers also addresses shock and vibration mitigation for the cells; improves electrical isolation of the cells from one another; allows access for inspection, maintenance and cell replacement; and provides a means of fire containment through isolation of small numbers of battery cells in the event that one or more cells begins to degrade or fail. This latter is an important consideration since a large battery pack can be comprised of about 50 to 500 large battery cells electrically connected in series. As can be appreciated, when all the cells are connected electrically in series, the current through each cell is the same as the output current of the battery pack, so a degrading or failed cell can rapidly become a thermal energy hotspot that can cause locomotive shut down or lead to a cell meltdown and potential battery pack fire.

FIG. 1 is a schematic side view of a battery pack, engine and ballast installed on a locomotive frame 300. The hybrid locomotive 300 has an operator's cab 301. Alternatively, this arrangement of engines, batteries and ballast may be used on a cabless hybrid locomotive. The engines 303 are typically located near the front of the hybrid locomotive 300 but, as can be appreciated, can be located elsewhere on the locomotive deck. The battery pack 304 typically occupies the largest volume in the hybrid locomotive 300 and usually represents the greatest weight component in the power pack. The battery 304 is therefore usually placed near the center of the locomotive frame to best distribute weight over each truck assembly 302. Often, the weight of the battery pack 304 is not sufficient to provide the required locomotive weight for best traction and so ballast 305 must be added. The ballast 305 may be placed to even out the weight distribution over the truck assemblies 302. The ballast 305 may be comprised of inert weight such as for example lead blocks or it may comprised of useful weight such as for example spare battery cells. A battery pack for a large hybrid locomotive may weigh as much as about 50,000 kg. Typically, a large battery pack is comprised of a least one module. The total weight of the module is preferably in the range of 1,500 kg to 15,000 kg. Each module must be able to be removed by means such as for example an overhead crane, a forklift or a mobile crane. The weight distribution of the battery pack when installed on a locomotive frame is such that the distribution of weight of the battery pack on each axle of the locomotive is preferably in the range of about 15,000 kg to 30,000 kg. The need for additional ballast to be added to balance the weight distribution of the battery pack on the locomotive, the weight of ballast being no more than about 50% of the weight of the battery pack. The weight distribution of the battery pack and the additional ballast is sufficient to permit a tractive effort per driving axle in the range of 0 to about 20,000 lbs force to be achieved for a rail adhesion coefficient of about 18% or greater.

Figure 2:
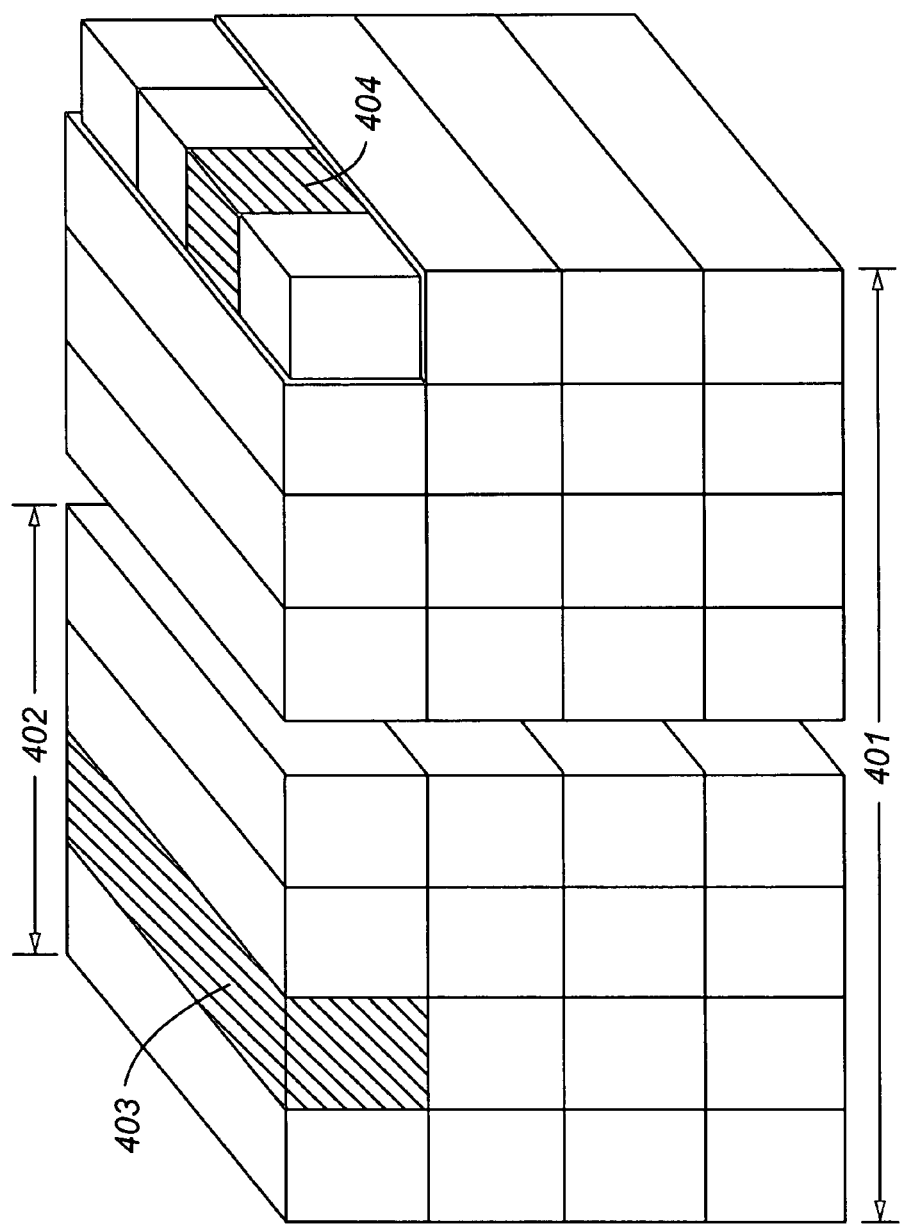
FIG. 2 is schematic of a large battery pack illustrating its principal divisions and components as used in the present invention.

FIG. 2 is a schematic of a large battery pack 401 illustrating its principal divisions and components as used in the present invention. A module is comprised of at least eight isolation containers. The total weight of an isolation container is preferably in the range of about 150 kg to 570 kg. Each isolation container must be able to be removed by means such as for example an overhead crane, a forklift or a mobile crane. The number of battery cells in an isolation container is at least two and may be as high as six, depending on the size and weight of the individual cells. The total weight of an individual cell is preferably in the range of about 70 kg to 120 kg. A battery cell must be able to be removed by means such as for example an overhead crane, a forklift, a mobile crane or manually by including lifting handles on the battery cells. The battery pack 401 shown in this example is comprised of two modules 402. The size of the battery pack 401 can be made larger by adding additional modules 402. Each module 402 is comprised of a number of isolation containers 403 which are shown here as long rectangular containers or drawers. Each isolation container 403 houses one or more individual battery cells 404 which are shown in the cutaway view of the top right drawer. Four individual battery cells 404 are shown in each drawer 403 in this example.

An important component of a preferred embodiment of the present invention is an isolation container in which a relatively small number of battery cells are housed. The number of cells housed in an individual isolation container are preferably between 1 and 10 and more preferably between 3 and 5. Expressed alternately, the energy storage capacity of the cells housed in an individual isolation container is preferably between approximately 2,000 and 20,000 kW-hours, where the capacity is based on a 10 hour discharge time.

The isolation container is preferably made from a high strength, high heat conducting metal such as for example a steel alloy, an aluminum alloy and the like. This type of material is preferred because it provides mechanical strength which is retained if the batteries contained within overheat and melt down. It also provides high heat carrying capacity to help carry away and distribute heat throughout the battery pack if the batteries inside overheat and meltdown.

The batteries housed inside the isolation container may be mounted using shock and vibration resistant clamps which keep the batteries firmly in their desired position while mitigating any mechanical vibration and shock loading experienced by the battery pack as a whole. The clamps also allow the batteries to stand off from the isolation container walls so that cooling air can be forced past the battery walls. The clamps also function to provide electrical isolation of battery cells and bus bars as will be discussed below. The battery pack and its components are preferably capable of normal operation under shock loading of no less than 2 times the acceleration due to gravity (2 gs). Individual cells are preferably able to withstand shock loading of no less than 2 gs and a constant vibration loading of no less than 0.00003-m deflection at 100 cycles per sec and 0.03-m deflection at 1 cps, and in between being approximately linear on a log-log plot.

It is preferable to design a battery pack having a fife expectancy expressed as a number of equivalent full discharge cycles greater than 500, more preferably a number of equivalent full discharge cycles greater than 1,000 and most preferably a number of equivalent full discharge cycles greater than 1,500. It is also preferred to design a battery pack having a period between routine servicing expressed as a number of equivalent full discharge cycles greater than 100 and more preferably greater than 500.

Finally, the isolation container is of a size and weight that can be lifted and moved by available equipment such as for example a dolly, a forklift or a portable crane. The isolation container preferably weighs between approximately 100 kilograms and 1,000 kilograms.

An example of such an isolation container is shown in the following sequence of figures which illustrate one of many possible configurations for a battery pack or capacitor bank comprised of isolation containers that form an embodiment of the present invention.

Figure 3:
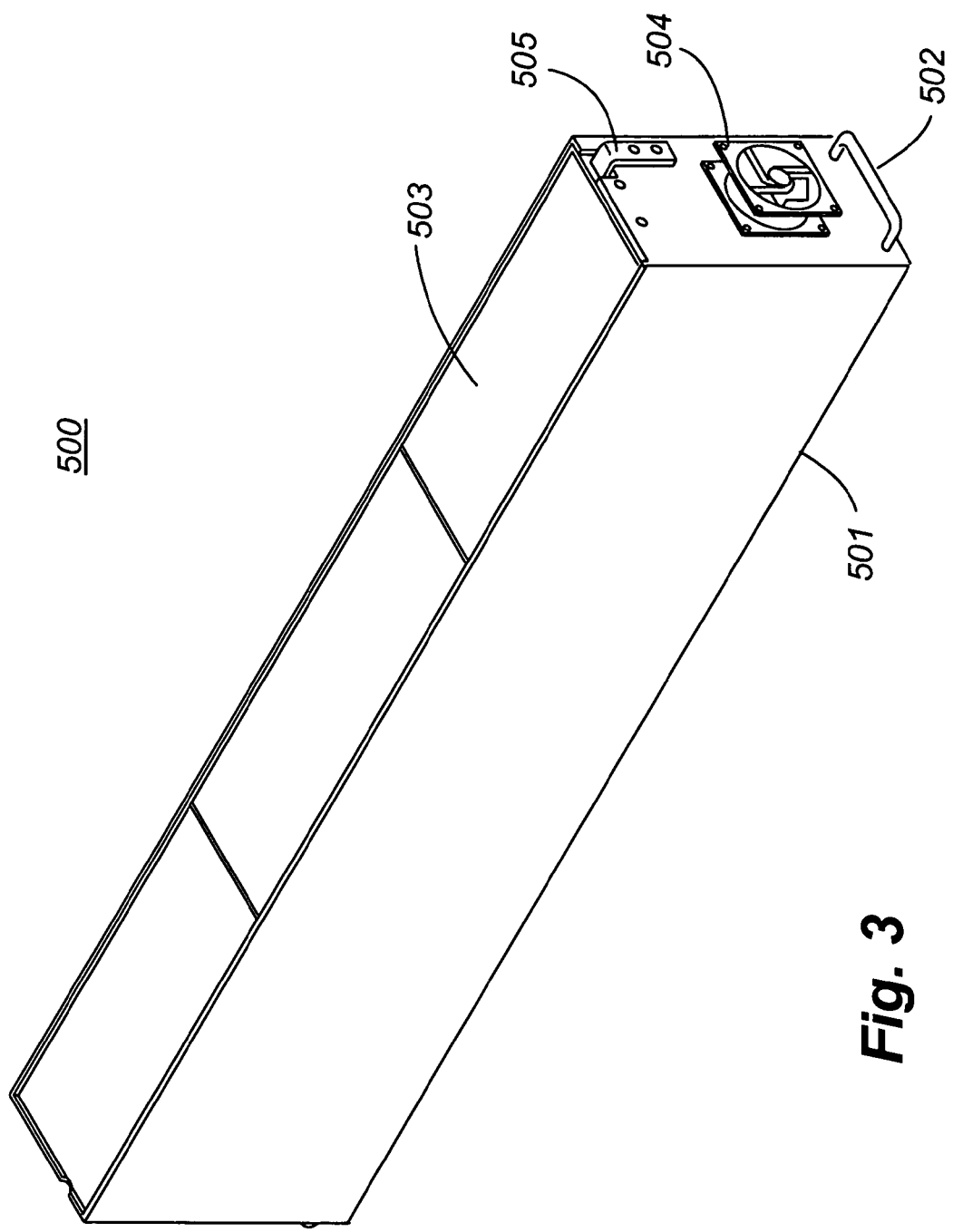
FIG. 3 which is an isometric view of a single isolation container of the present invention.

FIG. 3 which is an isometric view of a single isolation container 500 of the present invention. The isolation container 500 is shown as a sheet metal drawer 501 with a handle 502 for moving the drawer 501 into and out of a module frame (not shown) and an electrode 505 for connecting the battery cells in the drawer 501 to an adjacent or nearby drawer (not shown). The polarity of the electrode 505 is opposite from the polarity of the electrode extending from the drawer end not shown in this view. The drawer 501 in this example contains 3 large energy storage batteries and may have removable top covers 503 for inspection, servicing and/or replacement. The drawer 501 is shown with a fan 504 which can blow or suck air through the interior of the drawer 501. There may be another fan or a vent hole in the drawer end not shown in this view. The fan 504 and the vent hole (not shown) may also, if necessary, have shutters that open when the fan 504 is operative and close when the fan is off so as to further isolate the interior of the container 500.

Figure 4:
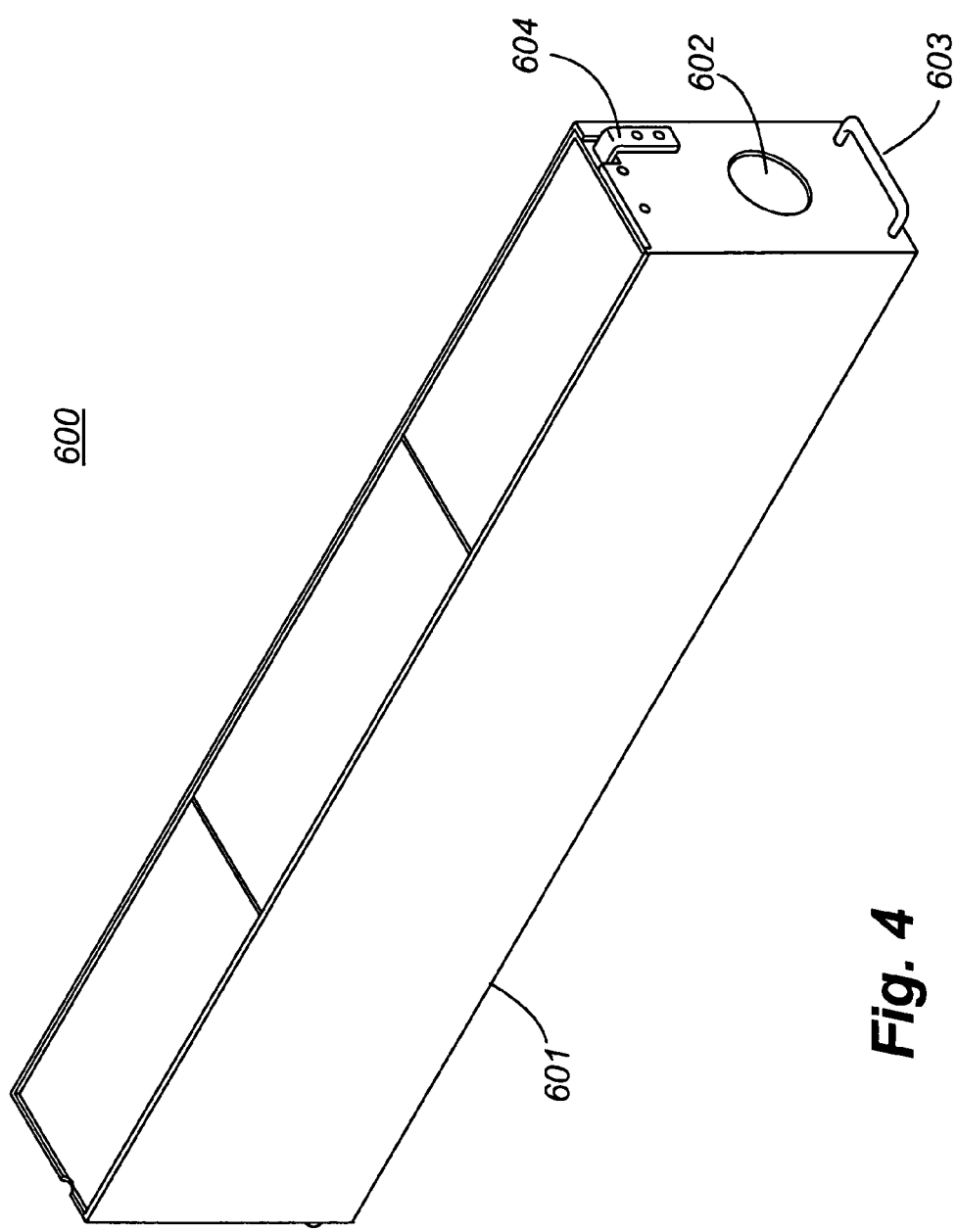
FIG. 4 shows an alternate isometric view of a single isolation container.

FIG. 4 shows an alternate isometric view single isolation container 600. The isolation container 600 is shown as a sheet metal drawer 601 with a handle 603 for moving the drawer 601 into and out of a module frame (not shown) and an electrode 604 for connecting the battery cells in the drawer 601 to an adjacent or nearby drawer (not shown). The polarity of the electrode 604 is opposite from the polarity of the electrode extending from the drawer end not shown in this view. The drawer 601 in this example contains 3 large energy storage batteries and may have removable top covers for inspection, servicing and/or replacement. The drawer 601 is shown with a vent hole 602 which can pass air blown or sucked through the interior of the drawer 601. As discussed below, the vent hole 602 may be affixed with a fan or a shutter which, when an overheating, meltdown or fire event occurs inside the isolation container 600, can act to further isolate the battery cells inside the isolation container 600.

Figure 5:
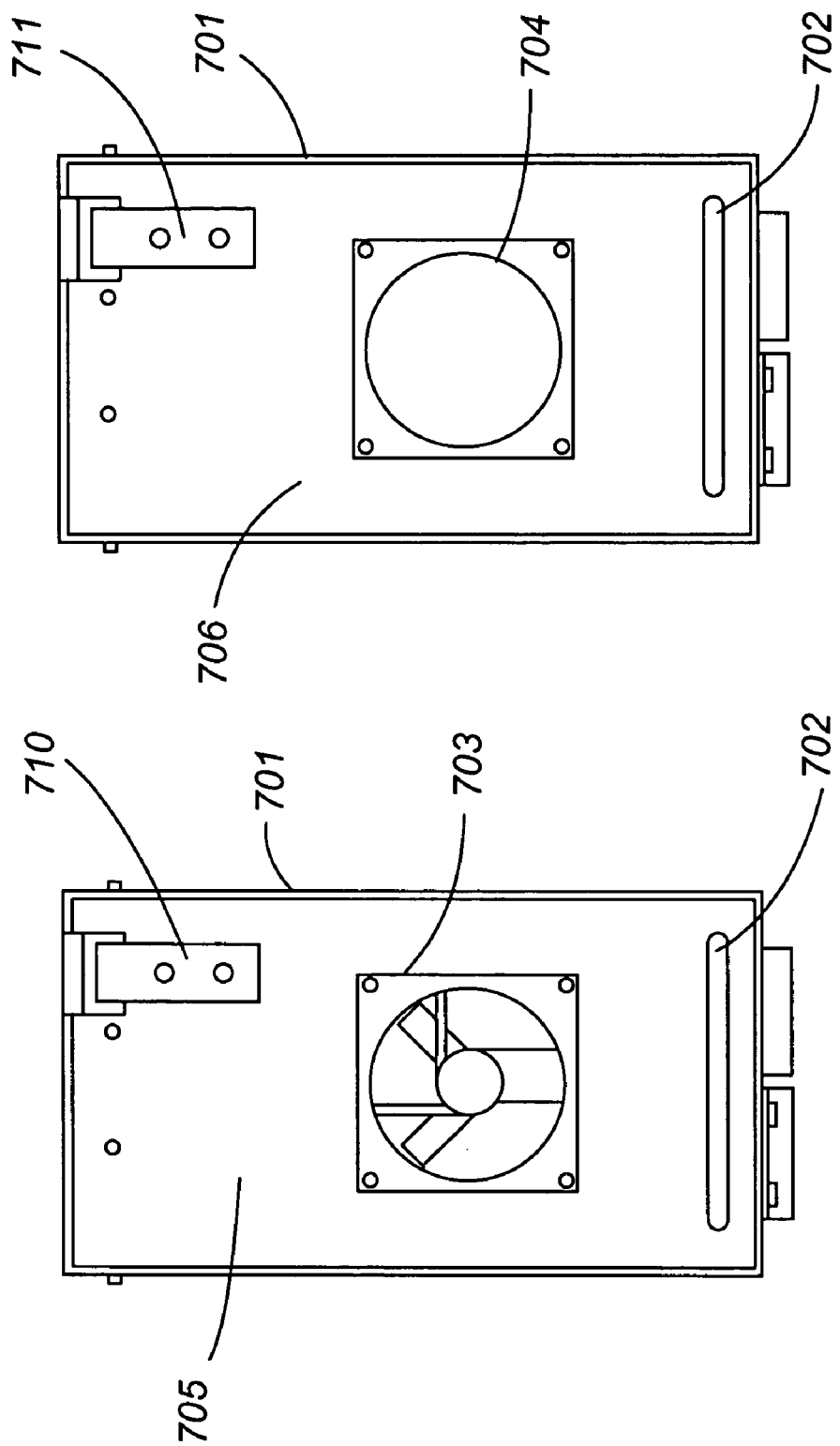
FIG. 5 shows both end views of an isolation container.

FIG. 5 shows both end views of an isolation container. FIG. 5a shows a front view illustrating the container walls 701, front plate 705, drawer handle 702 and electrode 710. In this example, a forced air convection fan 703 is mounted on the front plate 705. FIG. 5b shows a rear view illustrating the container walls 701, rear plate 706, a drawer handle 702 and electrode 711 which is opposite in polarity to electrode 710. In this example, a forced air convection exit hole 704 is formed into the rear plate 706.

Figure 6:
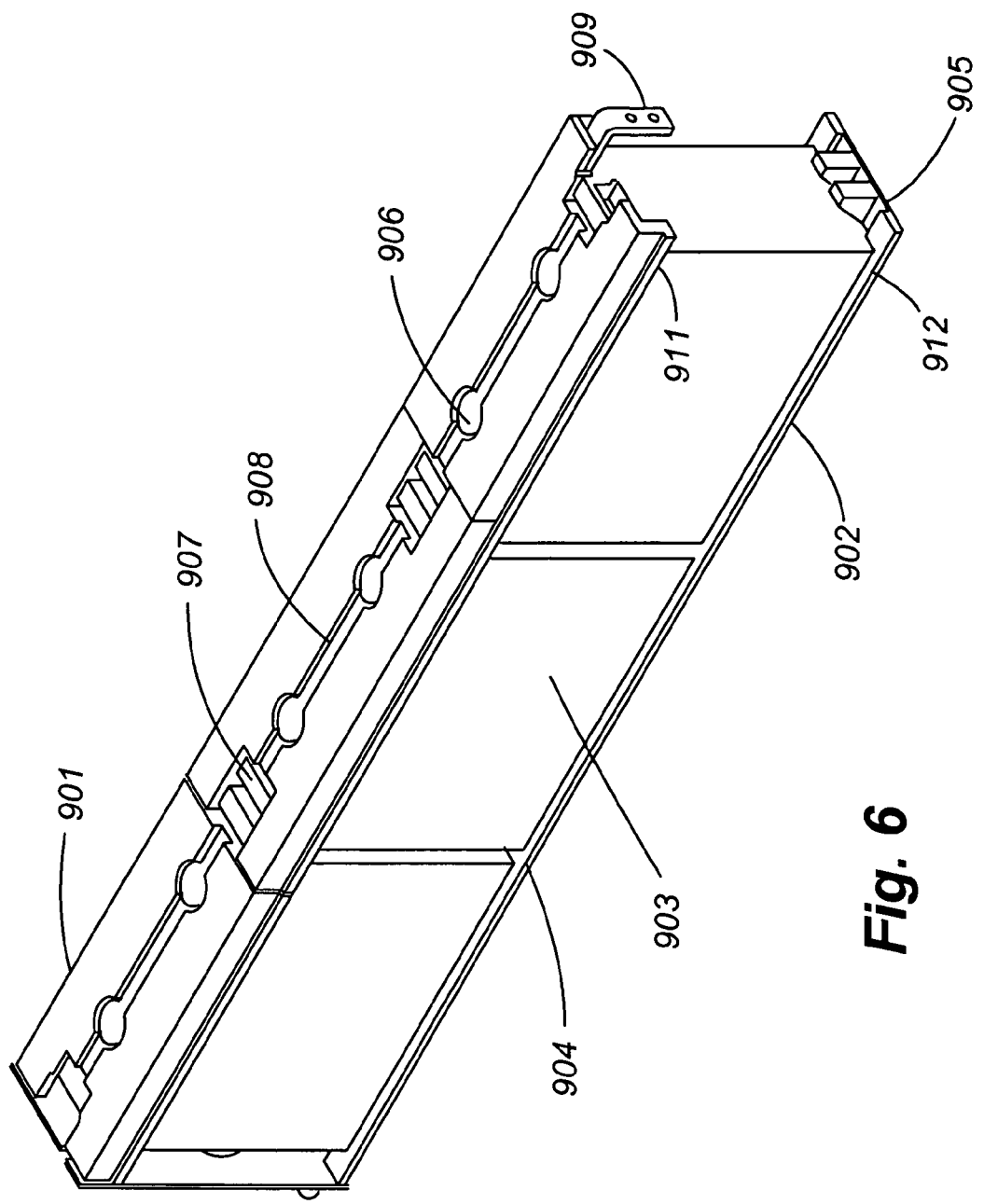
FIG. 6 shows a cutaway isometric view of batteries and clamps as positioned in an isolation container.

FIG. 6 shows a cutaway isometric view of batteries 903 and clamps 901 and 902 as they would be positioned in an isolation container. Three batteries 903 are shown in this example. The top clamp 901 is made of three parts, each of which contain cutouts for battery pressure relief vents 906 and other protruding components, such as lifting handles 907, of the battery cells 903. In addition, there is a gas flow channel 908 molded into the top clamp 901 that is in communication with one or both of the air flow ducts along the sides of the battery cells. This gas flow channel 908 allows gases vented from the vents 906 to escape into the interior of the isolation container where they will be carried off by the forced convection air flow along the sides of the battery cells. The gas flow channel is shown more clearly in the end view of FIG. 8. The bottom clamp 902 is shown in this example as a single piece with battery-to-battery separator tabs 904 and battery end tabs 905 molded as part of the lower clamp 902. The separator tabs 904 and end tabs 905 hold the batteries in position along the length of the drawer. In this example, the top clamp 901 is molded with a structural channel cross-section so that the flanges 911 of the structural channel allow the battery cells to be centered in the drawer. The bottom clamp 902 is also molded with a structural channel cross-section so that the flanges 912 of the structural channel allow the battery cells to be centered in the drawer in synchronization with the top clamp 901. The structural channel cross-sections of the top and bottom clamps are more clearly shown in the end view of FIG. 8. The clamps 901 and 902 are preferably made of a material that is tough, mitigates shock and vibration and is an electrical insulator. Such materials may be any one of several elastomer compositions such as for example certain urethane compositions, butyl and neoprene rubbers. Cast urethane, for example, is a preferred material. Other materials include but are not limited to polyethylenes, nylons and teflons. Fire resistant and/or fire suppressant capabilities are further desired characteristics of the clamp material. For example, sodium bicarbonate can be used as a filler material for cast urethane. When heated beyond the melting temperature of the battery case material, the clamp material containing sodium bicarbonate will emit carbon dioxide which will tend to suppress any fire originating from a battery cell meltdown. An isolation container preferably has provisions for isolation and containment of no less than 5 kW-hrs of energy storage capacity in the event of a battery cell meltdown or battery fire. Another advantage of the clamps 901 and 902 is that they prevent chaffing of the battery case by moving with the battery case under vibration loads. In addition, the elastomer clamps also minimize or eliminate stress concentrations building up in the battery case material. Stress fractures in battery cases have been observed to occur with the use of hard metallic clamping systems.

Figure 7:
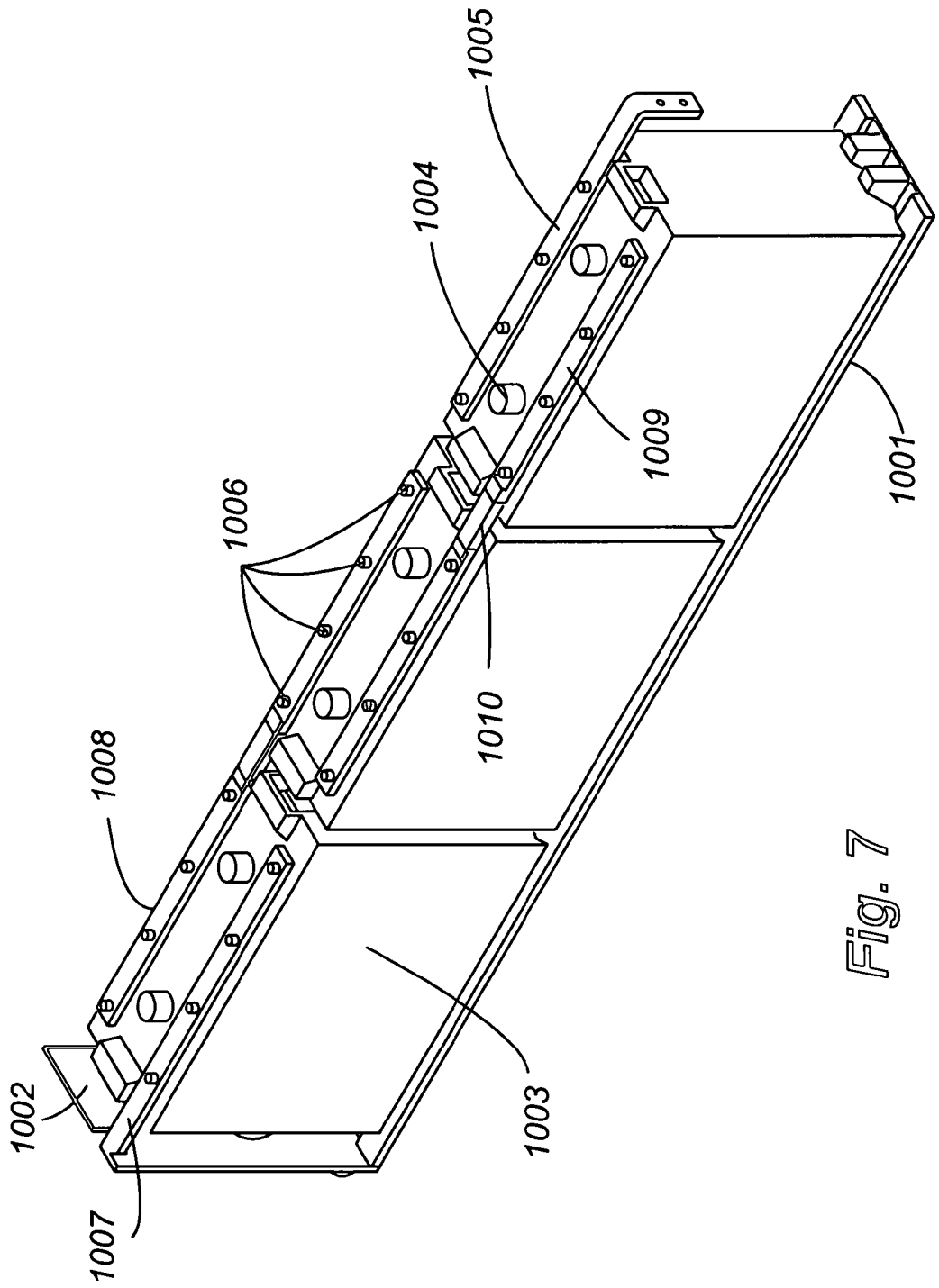
FIG. 7 shows an isometric view with batteries and electrical connections.

FIG. 7 shows an isometric view of the contents of an isolation container illustrating how battery cells may be connected in series. Three battery cells 1003 are shown positioned on a bottom clamp 1001. An end plate 1002 of the isolation container is also shown. The battery cells in this example are shown with pressure relief vents 1004. The battery cells 1003 in this example are shown with four terminals 1006 on each side of each battery cell 1003. There may be more or less terminals than shown in this example. The terminals 1006 are connected by electrical bus bars 1005 and 1007. In this example, the bus bars are themselves connected by interconnects 1010. One of several possible electrical connection arrangements for this example is as follows. Bus bar 1007 may be positive in polarity and connect four positive terminals of the leftmost battery where all four terminals are connected together internally to the positive output of the leftmost battery cell. Bus bar 1008 may connect four negative terminals of the leftmost battery where all four terminals are connected together internally to the negative output of the leftmost battery cell. Bus bar 1008 then is connected to the four positive terminals of the center battery cell. Bus bar 1009 then is connected to the four negative terminals of the center battery and the four positive terminals of the rightmost battery. Bus bar 1005 connects to the four negative terminals of the rightmost battery cell. In this example, then, the three battery cells 1003 are connected in series with the positive output at the leftmost end and the negative output at the rightmost end.

Although not shown in the example of FIG. 7, it is preferred to have a layer of insulation material on the ends of all the battery cells. The purpose of this insulation is to minimize the flow of heat generated inside of each battery cell from the ends of the battery cells in the same way that heat flow from the top and bottom of each battery cell is minimized by the top clamp and a bottom clamp. In the embodiment shown in the examples of FIG. 7, the electrode plates inside each battery cell are oriented such that the thin edges of the plates extend almost out to the side walls of the battery case. As will be discussed later, air is forced to flow along the outside walls of the battery case to convect heat generated inside of each battery cell out of the interior of the isolation containers. When the top, bottom and ends of each battery cell are insulated, heat generated inside of each battery cell flows mainly out of the side walls and this maintains each electrode plate and separator assembly at approximately the same thermal conditions. This tends to extend the lifetime of the battery pack as a whole by maintaining each battery cell within a predetermined range of temperature conditions. As may be appreciated, the battery cells may be installed such that the forced convection air flows over the top and bottom surfaces of the battery cells rather than the sides as discussed in connection with FIG. 8 below. The insulation material discussed above is preferably made of a material that is also tough, mitigates shock and vibration and is an electrical insulator. Cast urethane, for example, is such a material. Other materials include but are not limited to polyethylenes, nylons and teflons. Fire resistant and/or fire suppressant capabilities are further desired characteristics of the insulation material. For example, sodium bicarbonate can be used as a filler material for cast urethane. When heated beyond the melting temperature of the battery case material, the insulation material containing sodium bicarbonate will emit carbon dioxide which will tend to suppress any fire originating from a battery cell meltdown.

Figure 8:
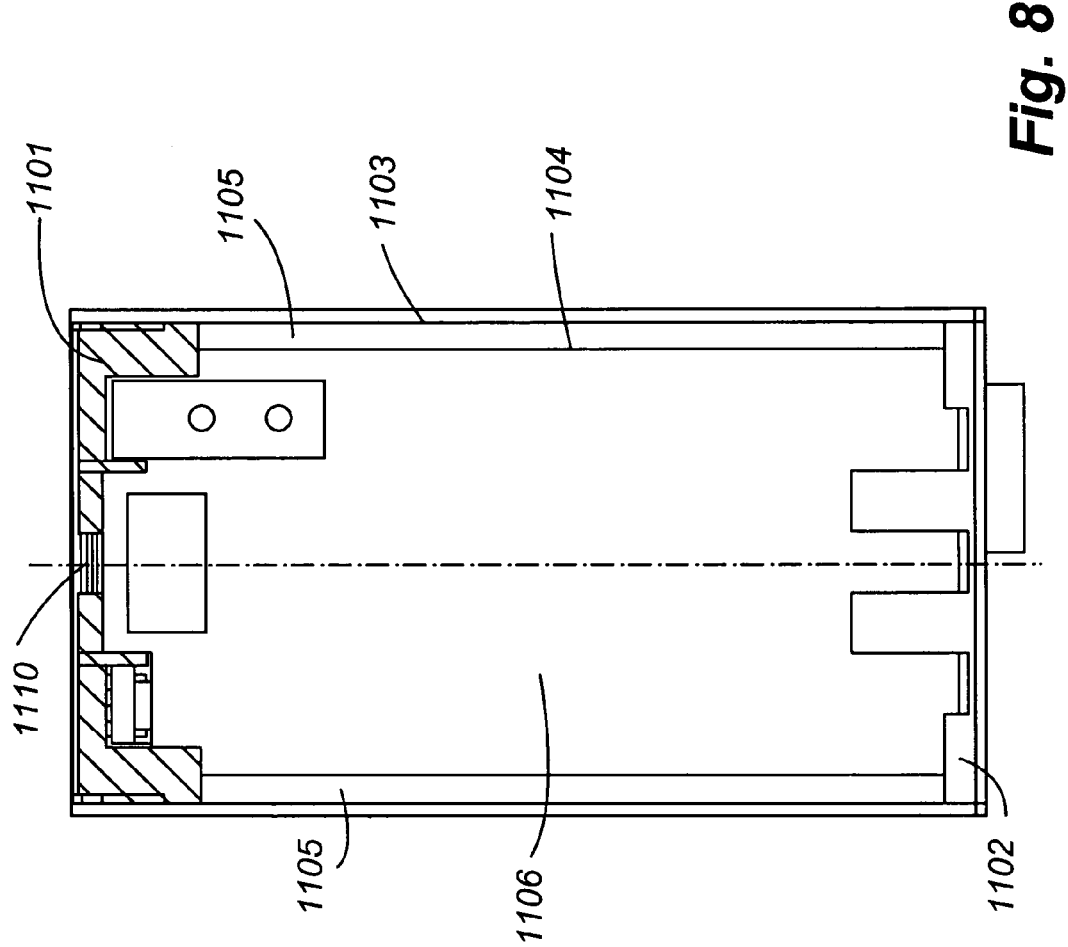
FIG. 8 shows an end view showing forced air flow channels.

FIG. 8 shows an end view illustrating a cross-section of an example of forced air flow channels within an isolation container. A battery cell 1106 is shown secured between a top clamp 1101 and a bottom clamp 1102 which positions the battery cell 1106 in this example with its side walls 1104 in the center of the isolation container 1103. In this example, the forced convection air cooling system forces air along both sides of the battery cells in the spaces 1105 which are formed by the outside of the battery side walls 1104 and the inside of the isolation container walls 1103. When operating, the battery cell 1106 generates heat internally which flows to the side walls 1104 of the battery. The heat is conducted through the battery side walls 1104 where it is exposed to the air flow which, in this example flows on both sides either into or out of the cross-sectional view. The air flow may be laminar but is preferably turbulent to enhance convective heat transfer of the heat from the side walls 1104 into the air flow forced past the sides 1104 and 1103 in the flow channels 1105. When the average heat flow from within the battery is known, the amount of air flow required to control the average cooling air temperature within desired limits can be computed using well-known heat flow analysis coupled with the known material properties of the side walls 1104, the air flowing down flow channels 1105 and the flow geometry. Also shown is the end view of a gas channel 1110 which is in communication with the air flow channels 1105. The function of the gas channel 1105 is to allow gases vented from inside the battery cells by the vents (shown for example in FIG. 6 as vent 906) to escape and be carried away by the air flow in channels 1105.

In a battery cell, heat is generated by $I^2R$ losses as current flow inside the battery cell encounters various internal resistances. These losses can be characterized by the average thermal power generated while the battery pack is in service. This heat must be dissipated to control the internal temperature of the battery cells. In the present example, internal heat can be conducted along the electrode plates and through the side walls of the battery case where it can then be wiped away by a forced air convection system. The forced air convection system must be capable of efficiently transferring the heat from the external side walls of the battery cells to the air flow. In addition, the mass flux of air must be capable of absorbing the heat flux from the battery cell side walls while limiting its temperature rise to within predetermined limits. The efficiency of heat transfer is characterized by ensuring fully developed turbulent air flow with a dimensionless Reynolds number in excess of approximately 10,000. Maintaining the forced air temperature rise to within a predetermined range of 3 degrees Celsius, for example, requires a minimum ambient air flow of at approximately 0.0005 cubic meters per second per watt of internal heat generation.

A typical large battery pack for a hybrid locomotive is designed for a peak amperage output capability preferably in the range of 1,000 to 5,000 amperes and an open circuit volts at full charge preferably in the range of 200 to 2,000 volts. In configurations where cells are electrically connected in series, individual cells preferably have a thermal energy dissipation rate, based on a continuous RMS output current of 300 amperes and no active cooling, in the range of 0.3 degrees per hour to 3 degrees per hour. Expressed in another way, individual cells preferably have a thermal energy generation rate of no more than 0.2 watts per kg of total battery pack weight, based on a continuous RMS output current of 300 amperes. In configurations where cells are electrically connected in series, individual cells preferably have a thermal energy dissipation rate, based on a continuous RMS output current of 500 amperes and forced convection cooling, preferably in the range of 0.3 degrees per hour to 3 degrees per hour.

In an alternate embodiment, air ducts may be molded into the battery cases in such a way that two or more battery cells may be nested so that the ducts are aligned. A forced air convective cooling system similar to that described for FIG. 8 can then be used to flow air through these ducts to cool the battery cells. In this embodiment, the battery cases can be fabricated with a material that absorbs shock and vibration. While this embodiment allows the temperature environment of battery cells to be controlled within a predetermined temperature range, it does not fully isolate battery cells from other battery cells in the event of a battery cell malfunction, meltdown or fire. However, with this embodiment, some active and passive fire control actions can still be taken. For example, the fans used to provide convective cooling can be shut down allowing shutters to close, effectively preventing further air intake inside of the air-flow ducts. Alternately or in addition, an inert gas or a fire retardant can be introduced into the air flow through the ducts to replace the air in the ducts. Alternately or in addition, the battery case material can be made from a material that contains a fire retardant or suppressant agent that can be liberated as a gas into the ducts molded into the battery case to dilute or replace the air in the ducts when a predetermined temperature threshold is exceeded.

Figure 9:
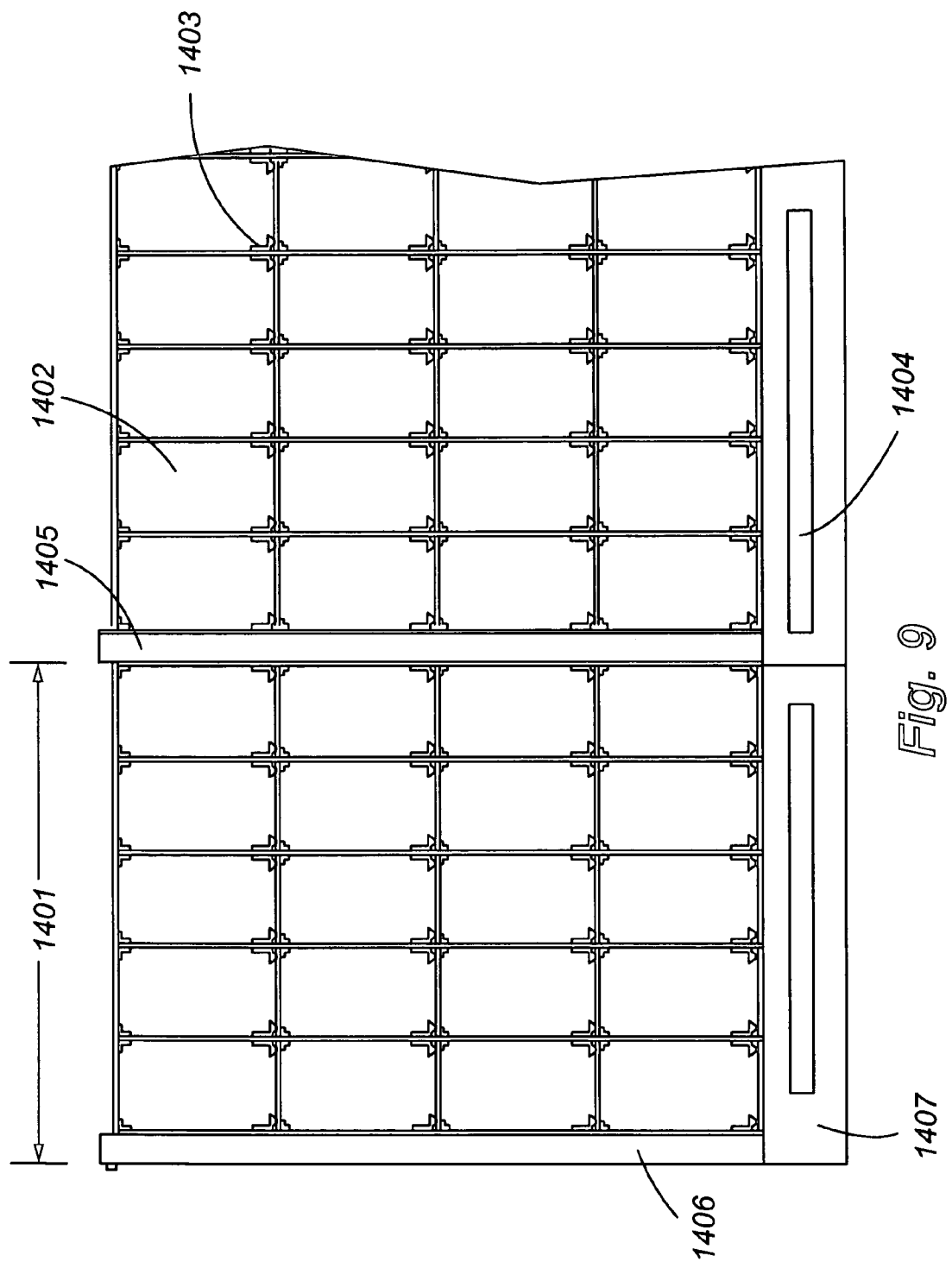
FIG. 9 shows an end view of a module frame.

FIG. 9 shows an end view of a battery pack module frame 1401 illustrating examples of structural rails 1403 for positioning isolation containers in compartments 1402 within the module frame 1401. The frame is shown with vertical structural members 1405 and 1406 and bottom structural member 1407. The bottom structural member 1407 and the top structural member (not shown) may have vents 1404 so that air can be circulated around the module from the top of the module to the bottom of the module which will act to minimize the temperature difference of the air around the module and prevent a buildup of higher temperature air at the top of the module. This will help control the temperature of the battery pack so as to maintain a relatively even temperature of the air in the battery pack. This in turn will tend to maintain the same air temperature for inlet air that is used for forced convection cooling of the battery cells within individual isolation containers.

Figure 10:
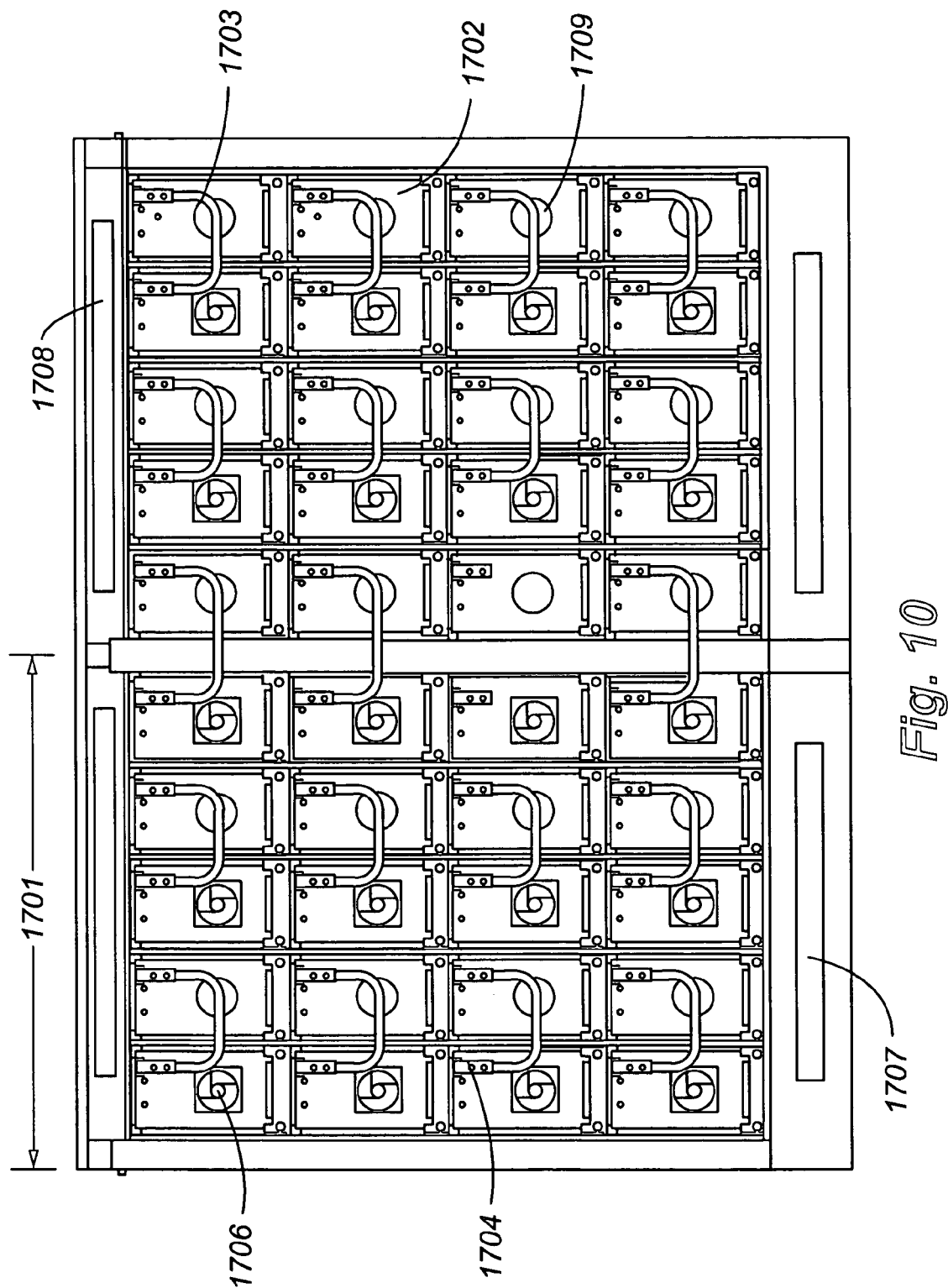
FIG. 10 shows an end view of a two module battery pack with electrical connections.

FIG. 10 shows an end view of a two module battery pack with electrical connections. This figure illustrates a module 1701 with all its isolation containers 1702 in place. The individual battery cells (not shown) inside the isolation containers 1702 are cooled by forced air convection which, in this example, air is forced past individual battery cells by fans 1706 and exits by open vent holes 1709. The air exiting from individual isolation containers 1702 is mixed by other fans (not shown) which circulate air through top vents 1708 around the front and rear sides of the module and back through bottom vents 1707. The air flow around the module through vents 1707 and 1708 is further illustrated in FIG. 13 by air flow arrows 2106 and 2108. This tends to mix all the air around the module to maintain approximately the same inlet air temperature for cooling the inside of the isolation containers 1702 so that all the individual battery cells are exposed to approximately the same thermal environment which, in turn, promotes longer battery cell lifetimes. As described in FIG. 11, the isolation containers 1702 are electrically connected to each other by low resistance, low inductance cables 1703 which are connected to isolation container terminals 1704.

Figure 11:
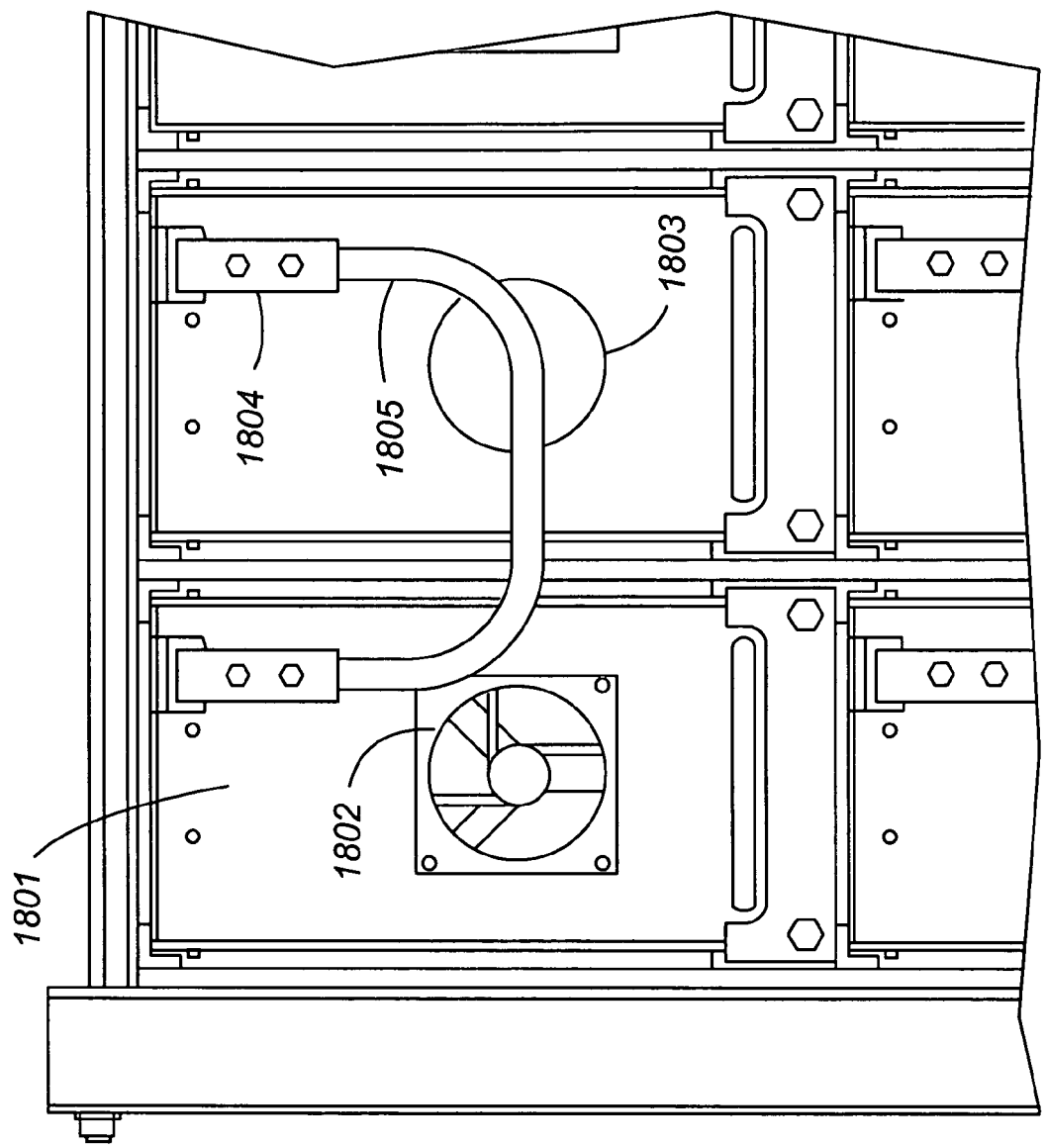
FIG. 11 shows a close-up end view with electrical connections.

FIG. 11 shows a close-up end view of isolation containers 1801 with drawer cooling fans 1802 and, in alternate drawers, cooling air exit vent holes 1803. Electrical connections are made between battery cell terminals 1804 and battery cell terminal in adjacent or nearby drawers by connecting cables 1805. The battery pack is preferably designed with connections from the battery pack to the DC traction motors having a total connecting line inductance of less than 10 microhenries and a total connecting line resistance of less than 10 milliohms.

Figure 12:
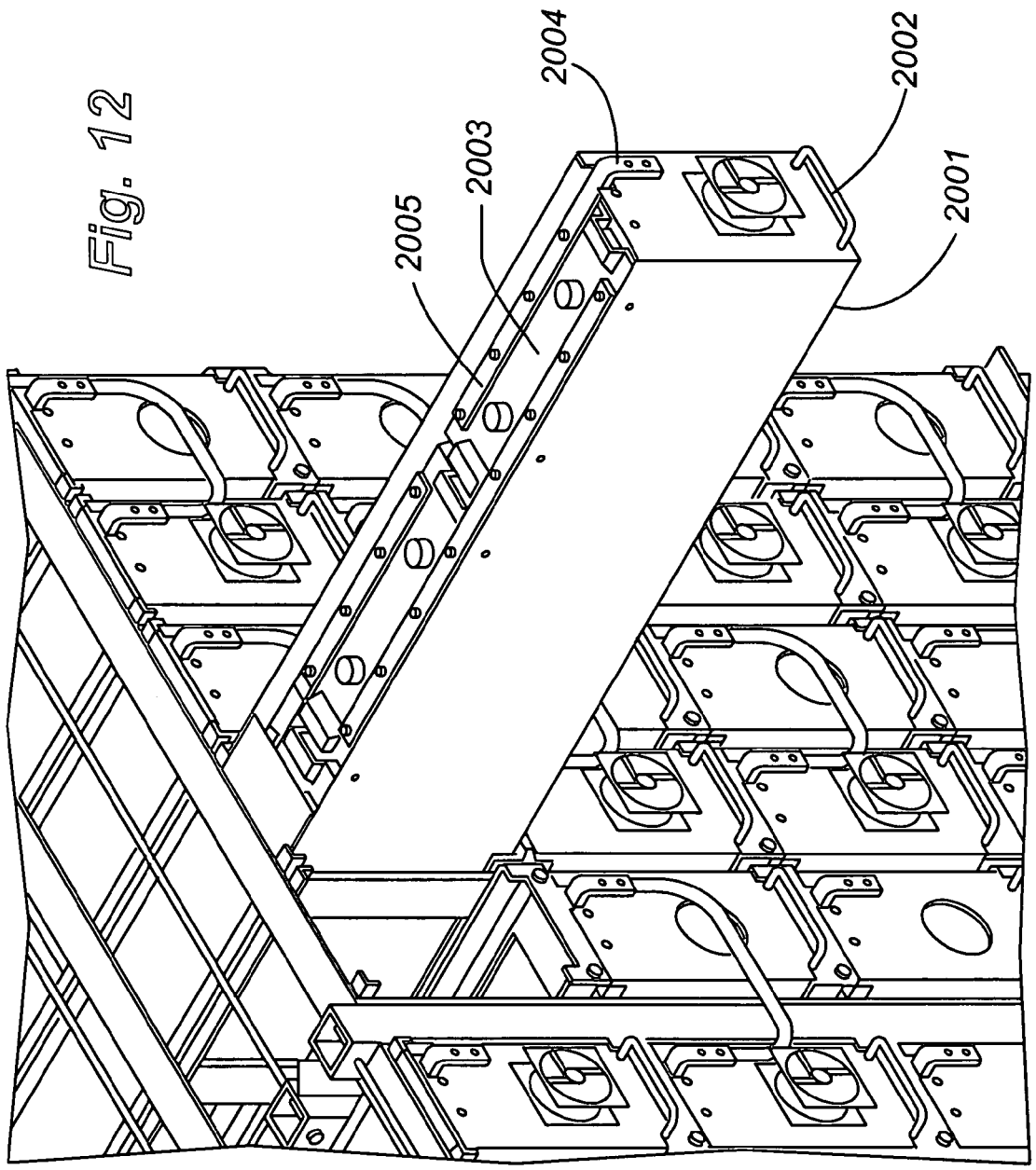
FIG. 12 shows an isometric close-up view of an extended isolation containers and battery cells.

FIG. 12 shows an isometric close-up view of an extended isolation container drawer 2001 with extraction handle 2002. In this view, the first two top battery cell drawer covers have been removed as well as the top clamps. The battery cells 2003 are shown in place along with the bus bars 2005 and terminal connectors 2004.

FIGS. 3 through 12 illustrate an example of an isolation container design for large energy storage cells that provides a means of controlling the uniformity of temperature of the cells by forced air convection and of mitigating mechanical vibration and shock loading using shock and vibration resistant clamps which keep the batteries firmly in their desired position. The containers also control the number of battery cells that can be affected if one or more battery cells overheats, experiences a meltdown and/or a battery fire. This is accomplished by placing a limited number of battery cells in isolation containers where, even if no active fire control is available, the maximum heat that can be generated can be safely dissipated by the isolation container and other battery pack structural components without overheating battery cells in adjacent or other nearby isolation containers. An improved design is provided where active fire control actions can be taken. For example, the fans used to provide convective cooling can be shut down allowing shutters to close, effectively isolating the inside of the isolation containers from further air intake. Alternately or in addition, an inert gas or a fire retardant can be introduced into the isolation container to replace the air in the isolation container. The battery cell clamps can be fabricated with a material that not only absorbs shock and vibration but also is a fire retardant or even fire suppressant material which becomes activated in the event of extreme battery overheating, battery meltdown and/or a battery fire. Thus the design of the isolation container, which is primarily dictated by the requirement to control the temperature differential between individual battery cells, can, when necessary, also serve to isolate the individual battery cells from other isolation containers to control overheating, meltdown and/or fire of one or more of the battery cells in the isolation container. The use of isolation containers is also configured to provide electrical isolation of individual battery cells from each other so as to avoid the possibilities for inadvertently shorting out battery cells. This is accomplished by clamping the battery cells with an electrically insulating material that does not compromise the shock isolation of the battery cells or the thermal balancing of the battery cells. This design feature also acts to extend the lifetime of the battery cells, and the battery pack as a whole, by minimizing or eliminating inadvertent short circuits. The use of isolation containers also readily allows inspection, monitoring, modification, servicing, maintenance and/or replacement of one or more battery cells in the battery pack no matter where in the battery pack they are located. This is accomplished by placing a limited number of battery cells in isolation containers where each isolation chamber can be quickly disconnected electrically and then either readily accessed or easily removed partially or completely from the battery pack.

Figure 13:
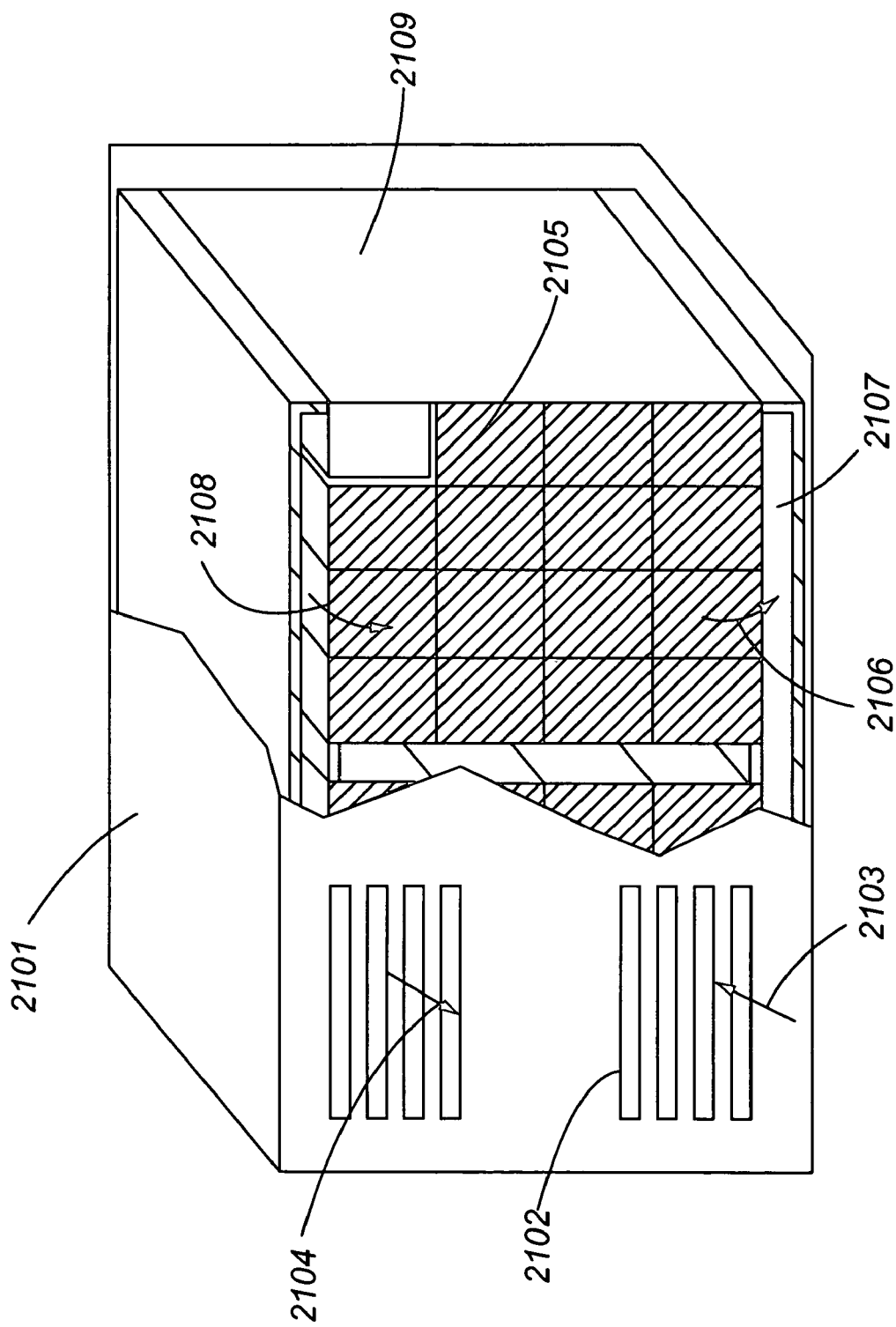
FIG. 13 shows a schematic of a possible air flow around a battery pack.

FIG. 13 shows a schematic of a possible air flow around a battery pack. This figure shows a section of a typical hybrid locomotive hood 2101 that covers a battery pack consisting of modules 2109. Air may be drawn into the battery compartment through louvers or vents 2102 in the hood such as depicted by the arrow 2103. Air may be expelled from the battery compartment through other louvers or vents 2102 in the hood such as depicted by the arrow 2104. Air may be drawn in or expelled through louvers or vents 2102 at the top or bottom or either side of the hood 2101 as required. The louvers or vents 2102 may be partially or fully closed such as for example when the locomotive is parked or the outside temperature is very low. The air inside the hood is further circulated around each module 2109 as depicted by arrows 2106 and 2108. The modules contain provisions such as the openings 2107 to allow air to circulate from the top of the battery pack, around the sides and under the battery pack so as to approximately equalize the air temperature in the battery pack compartment. The air in the battery pack compartment may be free to move laterally along the sides of the modules to further mix and equalize the air temperature inside the battery pack compartment.

Figure 14:
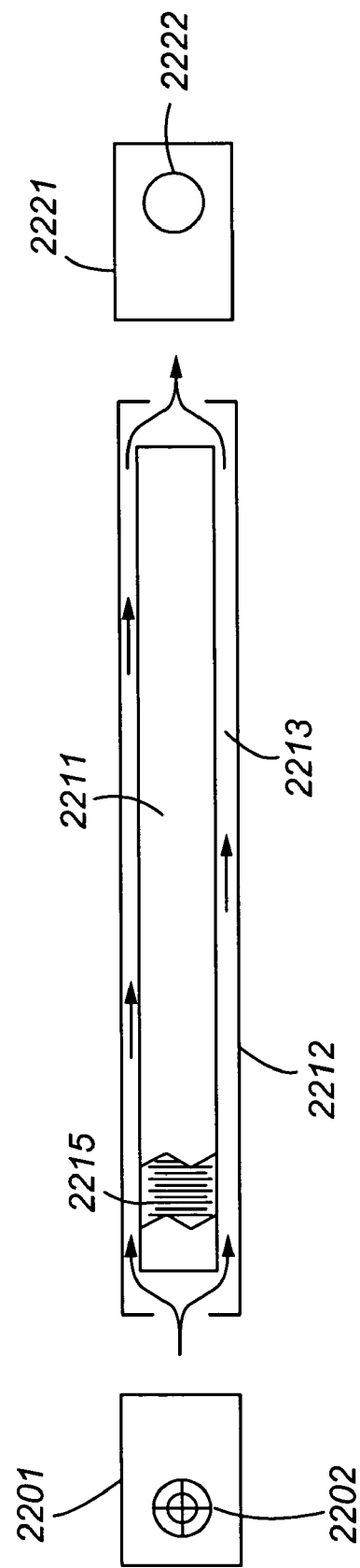
FIG. 14 shows a schematic of a possible air flow through an isolation container.

FIG. 14 shows a schematic of a possible air flow through an isolation container. FIG. 14*a* shows an end view of an isolation container 2201 with a forced convection cooling fan 2201. FIG. 14*b* shows a top cutaway view of an isolation container showing the battery cells 2211, the sides of the isolation container walls 2212 and the side of the battery walls 2213. The air flow in this example enters through the fan 2202 and flows along the two sides of the batteries between the container walls 2212 and the battery walls 2213 and then exits the container through the vent hole 2222. This flow pattern is indicated by arrows as shown. In a cutaway view of the cells 2211, cell plates 2215 are shown aligned such that internally generated $I^2R$ heat flows most readily along the plate pairs and through the sides of the cells past which forced air flows and convects the heat out of the isolation container. FIG. 14*c* shows end view of an isolation container 2221 with an exit vent hole 2222. The fan may be installed in either or both ends of the isolation container and may blow or suck air to force convective cooling. The fan may cause shutters (not shown) to open when the fan is in operation and the shutters may close when the fan is not operating. Alternately, shutters need not be used.

It is possible to monitor the voltage and temperature of each individual battery cell. For example, the voltage of each battery cell, when new, can be measured when charging at a predetermined rate and when discharging at a predetermined rate. This information can be stored in an on-board computer. If the internal resistance of a battery cell changes over time and increases out of its design range, the voltage measured during charging at the predetermined rate will be higher than when the battery cell was new. Additionally, the voltage measured during discharging at the predetermined rate will be lower than when the battery cell was new. Further, the operating temperature of the changing battery cell will tend to be higher than original battery cells because of the increased $I^2R$ losses. Therefore, by periodically monitoring battery cell temperature and voltage during charging and discharging, the results can be compared to the values stored in the on-board computer. If a battery cell is found to have a higher operating temperature than its adjacent neighbors and/or if its voltage during charging is higher than its design operating value and/or if its voltage during discharging is lower than its design operating value, then, if the battery is determined to be out of its specified range of operation, the battery cell can be shorted out to effectively remove it from the battery pack until it can be replaced.

The voltage across a battery cell can be measured by a voltmeter connected across bus bars 2005 in FIG. 12. This voltage can be read directly upon inspection or by conveying the voltage to the vehicle operator, a remote operator and/or to an on-board computer. The voltage may be conveyed by a wire connection or by a wireless technology. The temperature of a battery cell may be measured directly by a monitor affixed to a side or end wall of a battery cell or indirectly by a monitor affixed to an inside wall of an isolation container. The temperature monitor can be calibrated to directly measure the temperature of the outside wall of the battery cell or the air temperature in the space between the battery wall and the wall of the isolation container or a combination of the two. Similarly, a temperature monitor can be calibrated to measure indirectly the temperature of the outside wall of the battery cell (such as for example by infrared sensor) or the air temperature in the space between the battery wall and the wall of the isolation container or a combination of the two. The temperatures can be read directly upon inspection or by conveying the temperature readings to the vehicle operator, a remote operator and/or to an on-board computer. The temperature readings may be conveyed by a wire connection or by a wireless technology. The temperature readings may be made by any number of well-known means such as for example, thermocouples, infrared detectors, thermistors or the like.

It is possible to measure and monitor outside or ambient temperature and the temperatures in the battery pack compartment at various locations such as for example at the top, bottom and around the sides of individual modules. These measurements may be displayed to the vehicle operator, a remote operator or stored in an on-board computer allow the compartment and module air circulation systems to be operated either manually or automatically so as to optimize the temperature level and temperature distribution for achieving the control necessary to better extend the lifetime of the battery cells and battery pack. A battery pack preferably has individual temperature and voltage sensors on at least one of every six battery cells in the battery pack and with provision for measuring overall battery output voltage and current.

Figure 15:
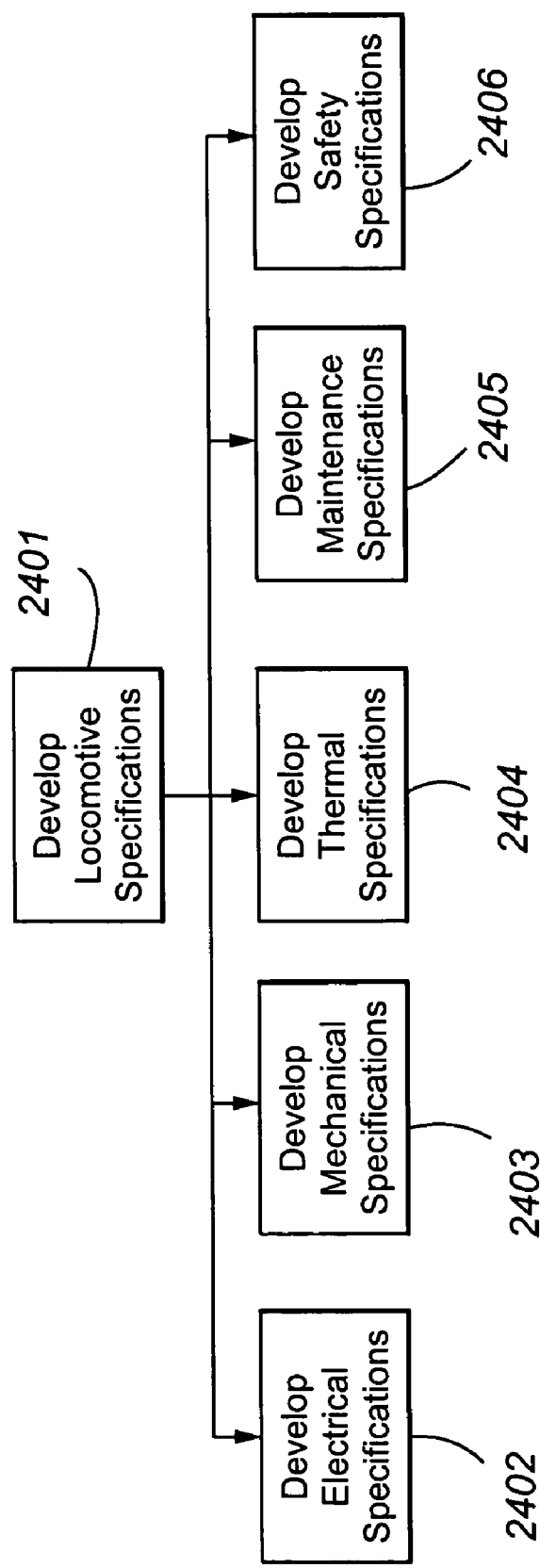
FIG. 15 shows an example of an overall approach for designing a large battery pack for a hybrid locomotive.

FIG. 15 shows an example of an overall approach for designing a large battery pack for a hybrid locomotive. The process generally consists of first drafting the specifications for the overall locomotive 2401 and thereupon designing a large battery pack (or capacitor bank) for the intended application from several perspectives. These include for example from the electrical 2402, mechanical 2403, maintenance 2405, thermal 2404 and safety 2406 perspectives. Each of these categories interacts with the others to varying degrees and may require an iterative approach, working back and forth to determine the optimum combination of parameters to best achieve the hybrid locomotive specifications.

Figure 16:
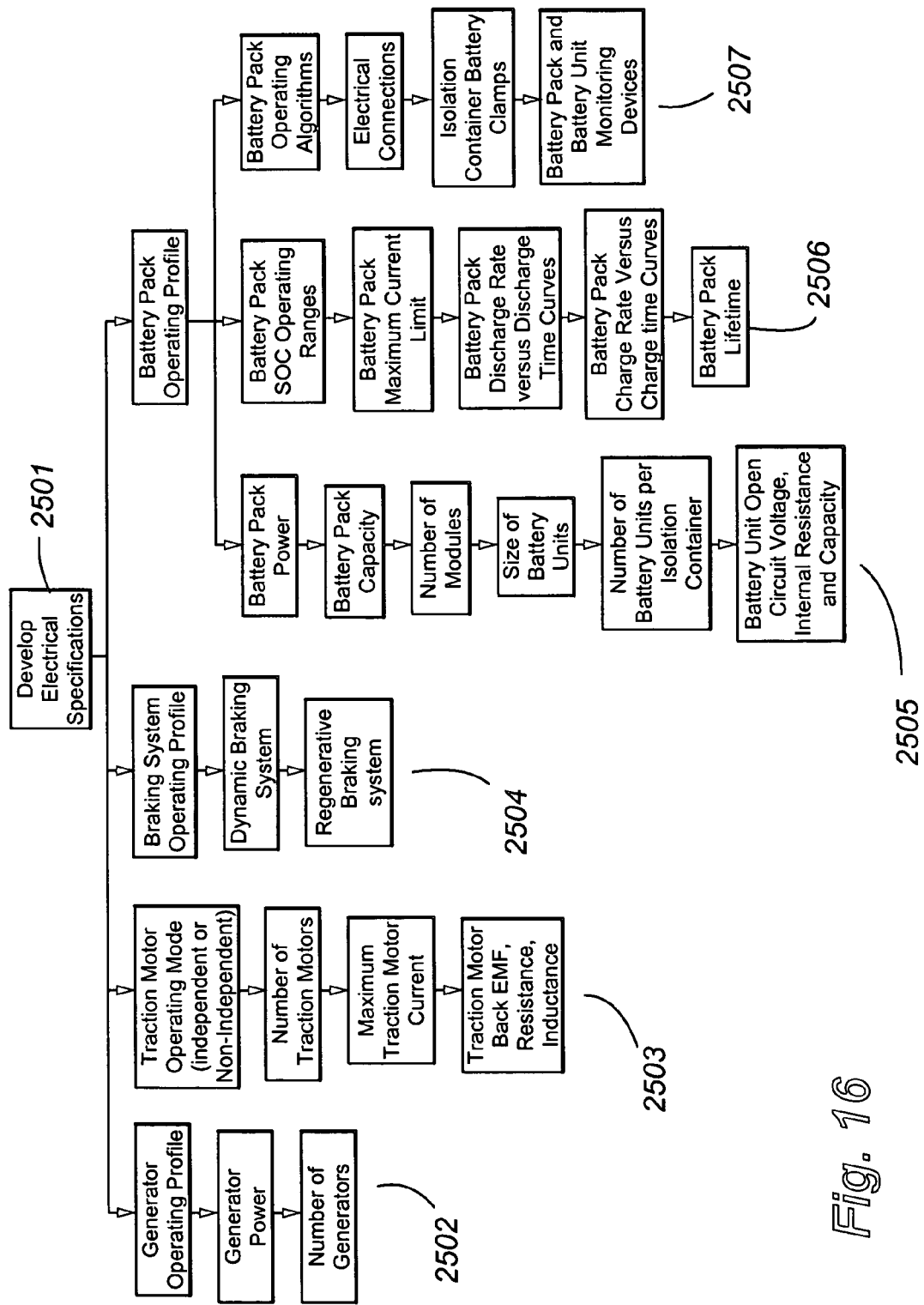
FIG. 16 shows an example of an approach for designing the electrical aspects of a large battery pack for a hybrid locomotive.

FIG. 16 shows an example of an approach for designing the various elements and features of a large battery pack for a hybrid locomotive from the electrical perspective 2501. For example, the number and power rating for the electrical generators are selected from the amount of generator power required and the projected generator operating profile as shown on branch 2502. The number of traction motors and the traction motor characteristics are determined as shown as for example in branch 2503. This branch includes determining how the traction motors will be operated. For example, a single chopper circuit may be used to control power to all the traction motors. Alternately, the power to each motor can be controlled by its own independent chopper circuit. This latter method is preferred to better control the power flow from the energy storage battery pack as well as for controlling asynchronous wheel slip and wheel skid. As shown in branch 2504, the braking system is specified and designed. The braking system may be a simple braking system, a dynamic braking system (in which the motors are switched to generator mode during braking, with the braking energy being dissipated) or a regenerative braking system (dynamic braking with some or most of the energy being recovered into an energy storage system). The main task of developing the electrical system is the three branches 2505, 2506 and 2507 where the battery energy storage system is designed. In branch 2505, the basic battery pack parameters are determined such as number of modules, how they are connected (some in series some in parallel for example), battery pack open circuit voltage, power and operating voltage. Branch 2506 includes determining the operating limits of the battery pack such as maximum and minimum preferred SOC limits, maximum current, charging and discharging procedures. These all tend to be selected to maximize battery pack lifetime while also being able to supply maximum power when needed for rapid acceleration. Branch 2507 includes design of electrical connections including circuit breakers, design of battery cell clamps as well as prescribing monitoring devices such as voltage current and temperature detectors. As can be appreciated, other design issues and parameters can be addressed and added to the basic procedures described in this diagram.

Figure 17:
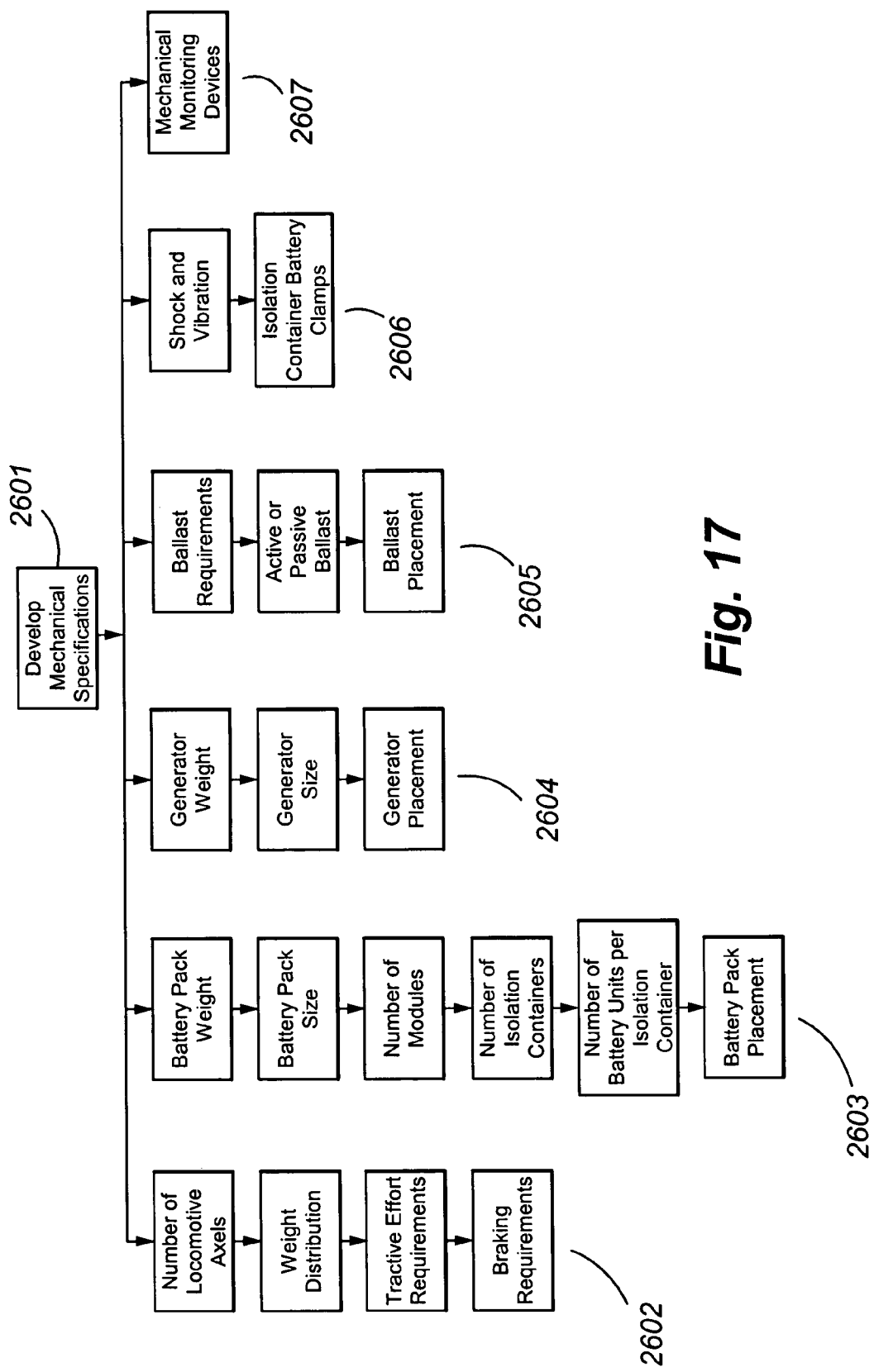
FIG. 17 shows an example of an approach for designing the mechanical aspects of a large battery pack for a hybrid locomotive.

FIG. 17 shows an example of an approach for designing the various elements and features of a large battery pack for a hybrid locomotive from the mechanical perspective 2601. The basic locomotive configuration including number of axles, weight distribution to provide the required tractive effort and the mechanical aspects of the braking system (such as maximum braking force available) are determined in branch 2602. The mechanical aspects of the battery pack such as size, weight and configuration are determined in branch 2603 to best provide the optimum weight distribution on the locomotive drive axles. The generator size weight and positioning are specified as illustrated in branch 2604, the generator location being important from an electrical, weight distribution and maintenance perspective. After the battery pack and generator are positioned, any ballast required to finalize the optimum weight distribution is specified as shown in branch 2605. The mechanical design of the isolation containers include the shock and vibration design of the module frames and the clamps used to secure the battery cells in each isolation container mounting as illustrated in design branch 2606 for shock and vibration considerations. Finally, mechanical monitoring devices, such as for example accelerometers, strain gages and the like, are specified as shown in branch 2607. As can be appreciated, other design issues and parameters can be addressed and added to the basic procedures described in this diagram.

Figure 18:
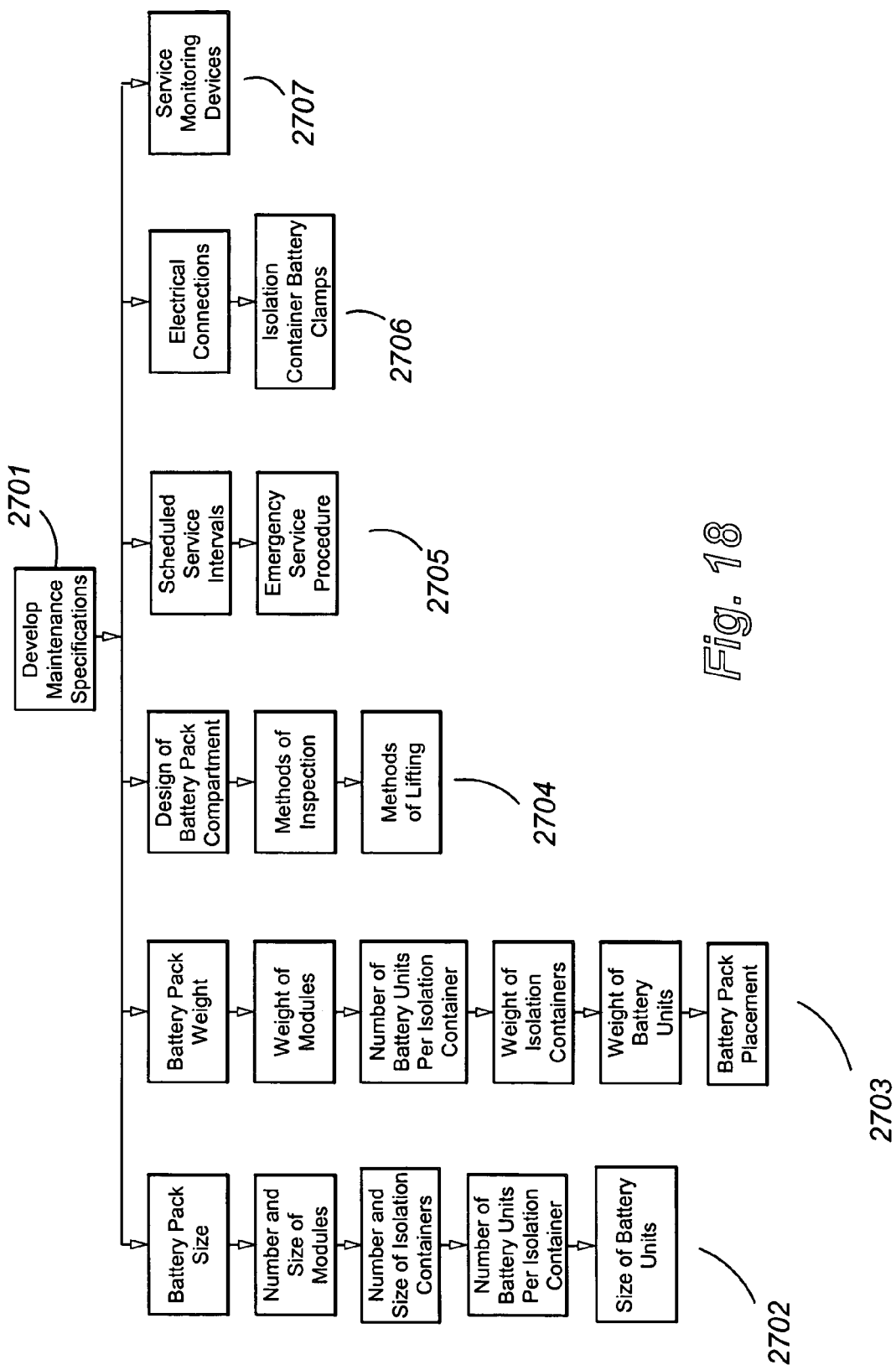
FIG. 18 shows an example of an approach for designing the maintenance aspects of a large battery pack for a hybrid locomotive.

FIG. 18 shows an example of an approach for designing the various elements and features of a large battery pack for a hybrid locomotive from the maintenance perspective 2701. As shown for example by branch 2702, the configuration and size of the battery pack must be considered from the point of view of maintenance requirements as established in branch 2705. The weight of the battery pack and its components must be considered from the point of view of maintenance requirements as established in branch 2705 as determined in branch 2703. The means of inspecting, performing routine and emergency maintenance and replacement of battery cells, isolation containers, modules and even the entire battery pack is considered in branch 2704. This includes designing the battery compartment housing and specifying the means by which each element may be removed by lifting. The design of electrical connections and clamps from the maintenance perspective is considered in branch 2706. These are examples of items that can make maintenance easy or difficult. For example, design of quick-disconnect electrical connectors between isolation containers such as shown in FIG. 12 can make it straightforward to pull out isolation containers for various tasks. Similarly, the design of the clamps such as shown in FIG. 6 can allow for rapid removal so that, for example, individual battery cells can be removed using, for example, handles and/or lifting hooks built into the battery cell cases such as shown in FIG. 7. Finally maintenance monitoring devices such as for example temperature sensitive strips are designed into the system as shown in branch 2702. As can be appreciated, other design issues and parameters can be addressed and added to the basic procedures described in this diagram.

Figure 19:
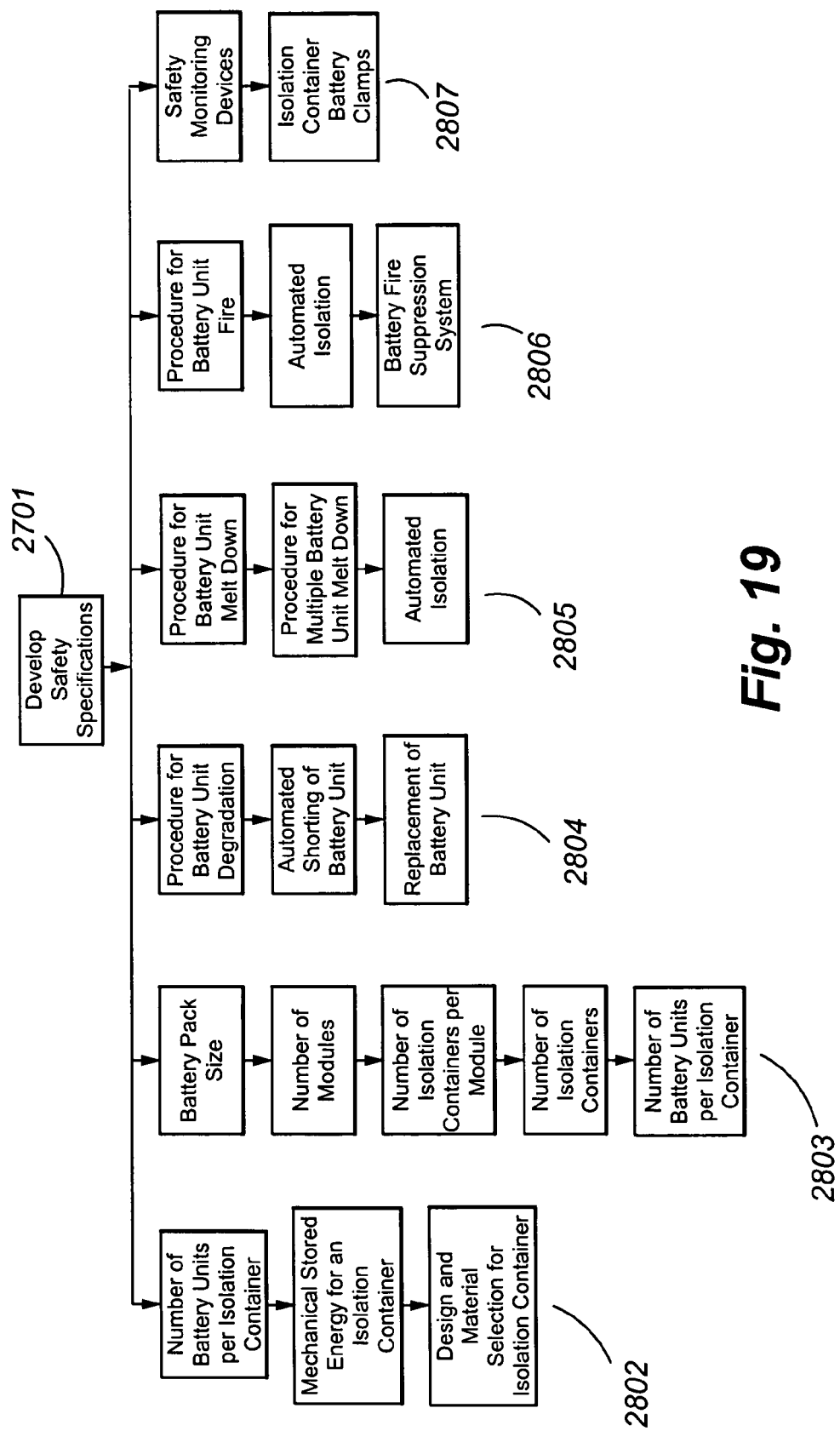
FIG. 19 shows an example of an approach for designing the safety aspects of a large battery pack for a hybrid locomotive.

FIG. 19 shows an example of an approach for designing the various elements and features of a large battery pack for a hybrid locomotive from the safety perspective 2801. One of the principal safety features of the preferred embodiment is the ability to isolate a predetermined maximum quantity of electrical stored energy within an isolation container. This is approximately the maximum amount of energy that an isolation container can isolate and contain in the event of a meltdown or fire of one or more of the battery cells installed in an isolation container. This is determined in branch 2802. The ability of the battery pack structure to distribute and dissipate the unintended rapid release of energy from an isolation container is determined in branch 2803. Procedures for handling routine battery cell problems, such as for example, overheating, from a safety perspective are defined in branch 2804. Procedures for handling non-routine battery cell problems, such as for example, battery meltdown, from a safety perspective are defined in branch 2805. Procedures for handling emergency battery cell problems, such as for example, a battery fire, from a safety perspective are defined in branch 2806. Finally the design of various components such as the battery retaining clamps and monitoring devices is carried out as shown in branch 2807. For example, the battery clamps may be designed using a fire retarding or fire suppressing material, which when exposed to high temperatures typical of a meltdown or fire, generate gases such as for example carbon dioxide which help displace oxygen inside the isolation containers and suppress further burning. Another example, is a heat sensitive switch that shuts off the forced air convection fans to stop the supply of air. Monitoring devices include, for example, temperature sensors which, when a predetermined temperature threshold is exceeded, sound an alarm in the locomotive cab and activate automatic systems shutdown and initiate any active fire-suppression systems. As can be appreciated, other design issues and parameters can be addressed and added to the basic procedures described in this diagram.

Figure 20:
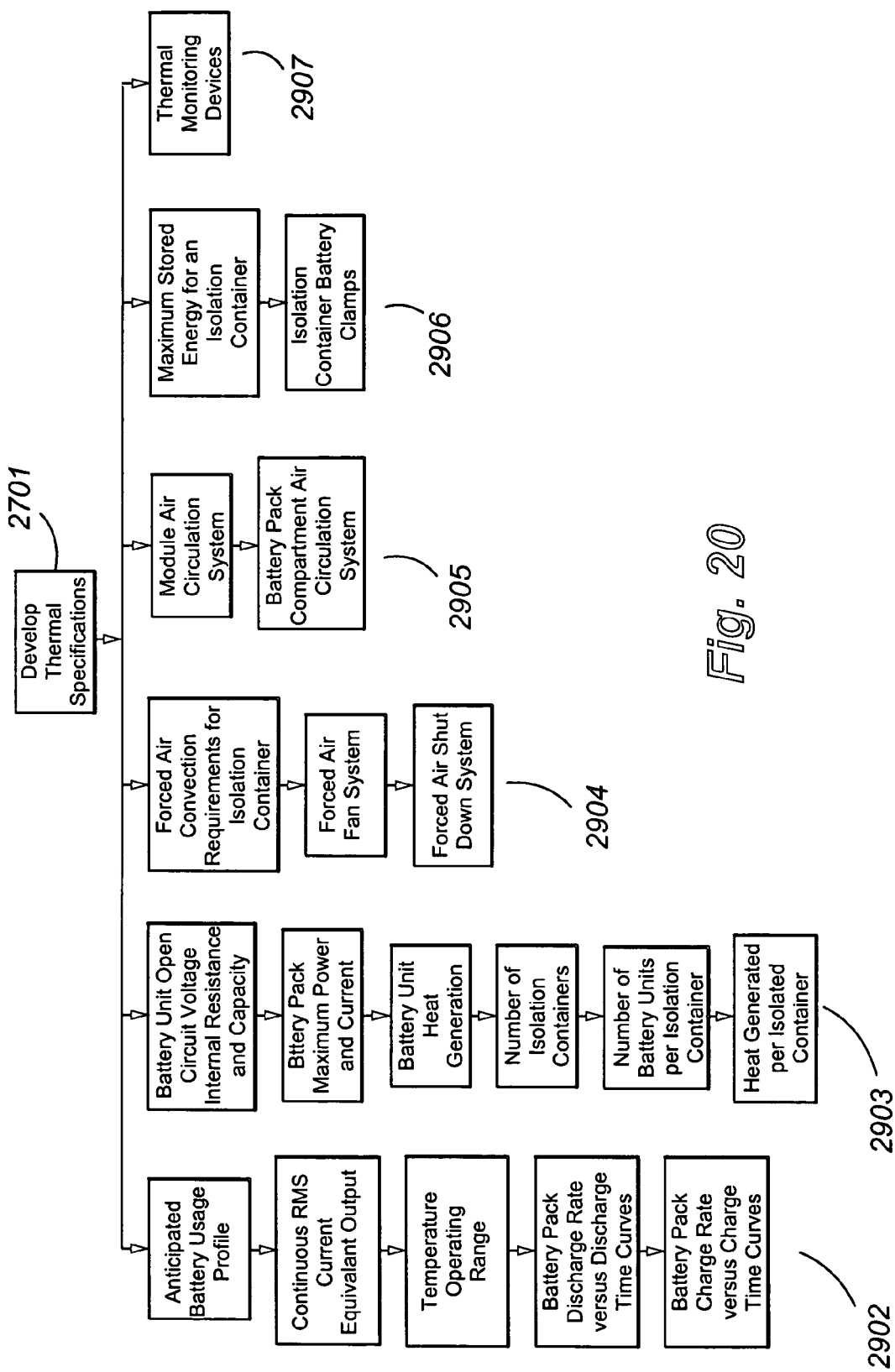
FIG. 20 shows an example of an approach for designing the thermal aspects of a large battery pack for a hybrid locomotive.

FIG. 20 shows an example of an approach for designing the various elements and features of a large battery pack for a hybrid locomotive from the thermal or heat control perspective 2901. The basic operating regime for the battery pack is determined in branch 2902. This includes the specified temperature operating range, the battery pack charging and discharging requirements. Branch 2903 is focused on maximum charging and discharging currents, the maximum energy contained in each battery cell that can be converted to heat and the configuration of isolation containers and modules from a heat containment and heat dissipation perspective. A forced air convection system for the isolation containers is specified in branch 2904. This system, which may be comprised of individual fans and shutters or larger fans that provides air flow to a number of isolation containers via a plenum arrangement, is designed to maintain the battery cells in an isolation container within a predetermined range of temperature variation so that each battery cell is exposed to approximately the same thermal environment. The design of the module and battery pack compartment air circulation systems is specified in branch 2905. The function of the module air circulation system is to mix all the air around the module so that it does not stratify and to keep all the air forced into each isolation container in a module within a predetermined range of temperature variation. The function of the battery pack compartment air circulation system is to control the flow of air into and out of the battery pack compartment depending on inside temperature conditions and outside ambient temperature. For example, on very cold days, it may be preferable to shut out outside air until the inside temperature achieves a predetermined temperature threshold and then to intake outside air when the inside temperature exceeds a predetermined temperature threshold. Alternately, on very hot days, it may be preferable to shut out outside air until the inside temperature exceeds the outside temperature whereupon the system can then input outside air when it is cooler than the inside temperature. Components such as for example the battery cell hold down clamps are considered from a thermal perspective as shown in branch 2906. For example, the clamps may be designed to be compatible with the forced air convection system in the isolation containers and may contain provisions for allowing heat flow from the top, bottom and sides of the battery cells not directly cooled by the forced air cooling system. Finally, as shown in branch 2907, thermal monitoring devices are specified for the isolation containers, module and battery pack compartment to allow monitoring and control of the air cooling and circulation systems as well as the thermal environment around battery cells in the isolation containers. Thermal monitoring devices include for example thermocouples, thermometers, infrared detectors and the like. It is also possible to use voltage and current sensors to determine internal resistance of individual battery cells and from this infer the internal energy dissipation occurring in individual or groups of battery cells. As can be appreciated, other design issues and parameters can be addressed and added to the basic procedures described in this diagram.

As can be seen from the forgoing discussion of FIGS. 15 through 20, the design and operational procedures for a hybrid locomotive are complex and require coordinating and iterating mechanical, electrical, thermal, maintenance and safety considerations in the sizing and placement of the major components such as the generator(s) and battery pack on a locomotive frame. There are a number of ways in which to accomplish the above objectives. The preferred embodiment described herein is directed towards a design and operating approach that maximizes battery pack lifetime by controlling the mechanical and thermal environment of the battery pack such that all individual battery cells experience, as closely as possible, the same mechanical and thermal conditions. This control of environment in combination with an operating strategy that controls the operational SOC range of the battery pack and utilizes the most advanced operational charging algorithms, all act to extend battery pack lifetime as defined by total ampere-hour throughput so that the lifetime begins to approach that of a float service battery pack. Long battery pack lifetime is one of the keys to a commercially viable hybrid vehicle, especially a hybrid locomotive. This is because the cost of battery energy is essentially equal to the capital cost of the battery pack divided by its lifetime as defined by its total ampere-hour throughput. If battery energy is expensive, it makes less and less sense to use generator energy to charge the battery pack. Even energy recovered by a regenerative braking system has a cost because (1) it reduces remaining lifetime of the battery pack and (2) it requires additional generator energy to transport a heavy battery pack. Ultimately, high-cost battery energy (which can result for example from a shortened lifetime) can negate any environmental benefits of a battery pack energy storage system, except in the most restrictive applications such as for example in long tunnels or underground stations.

A number of variations and modifications of the invention can be used. As will be appreciated, it would be possible to provide for some features of the invention without providing others. For example in one alternative embodiment, the various inventive features are applied to vehicles other than locomotives, such as cars, railroad cars, and trucks. The control logic set forth above may be implemented as a logic circuit, software, or as a combination of the two.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A battery pack assembly, comprising: a plurality of battery cells; a battery rack; and a plurality of isolation containers supportably mounted on and movably engaging the battery rack, each isolation container comprising a plurality of battery cells, wherein each isolation container comprises a vibration resistant clamp engaging at least one surface of a battery cell to substantially maintain shock and vibration levels within predetermined maximum values, said clamp comprising a gas flow channel in fluid communication with at least one gas vent of the battery cells to direct vented gas into the isolation container, wherein the clamp is configured to center each of the battery cells in the isolation container, and wherein each isolation container comprises at least one of the following features:
   (i) an airflow path passing through the isolation container to remove thermal energy from the enclosed battery cells; and
   (ii) an electrical isolation assembly to substantially inhibit contact of at least a portion of each battery cell with a conductive surface of at least one of the isolation container and battery rack.

2. The battery pack of claim 1, wherein each isolation container includes feature (i) and a surface of the airflow path is provided by a surface of the outer casings of the enclosed battery cells.

3. The battery park of claim 2, wherein each isolation container includes an air input and output and wherein the air input and output are located on differing surfaces of the isolation container to provide the airflow path.

4. The battery pack of claim 3, wherein the isolation container comprises a fan positioned in the airflow path.

5. The battery pack of claim 3, wherein in each battery cell the outer case casings house a plurality of plate pairs and wherein the airflow path is defined by a plurality of interlocking ducts molded into the outer casings of a number of adjacent plate pairs.

6. The battery pack of claim 1, wherein each isolation container includes feature (ii).

7. The battery pack of claim 6, wherein the electrical isolation assembly is the vibration resistant clamp and wherein the vibration resistant clamp is electrically insulative.

8. The battery pack of claim 7, wherein the clamp further comprises at least one of polyurethane, polyethylene, nylon, polytetrafluoroethylene, and mixtures thereof.

9. The battery pack of claim 1, wherein each isolation container is an enclosure comprising end surfaces, top and bottom surfaces, and side surfaces, wherein each isolation container moves outwardly in a drawer-like manner, and wherein the top surfaces comprise at least one inspection door for accessing the enclosed battery cells when the isolation container is displaced outwardly from the battery rack.

10. A battery pack assembly, comprising: a plurality of battery cells; a battery rack; and a plurality of isolation containers supportably mounted on and movably engaging the battery rack, each isolation container comprising a plurality of battery cells, wherein each isolation container is an enclosure comprising end surfaces, top and bottom surfaces, and side surfaces, wherein each isolation container moves outwardly in a drawer-like manner, and wherein the top surfaces comprise at least one inspection door for accessing the enclosed battery cells when the isolation container is displaced outwardly from the battery rack.

* * * * *